(12) United States Patent
Bowers

(10) Patent No.: US 12,477,250 B2
(45) Date of Patent: Nov. 18, 2025

(54) APPARATUS, SYSTEM, AND METHOD OF PROCESSING PIXEL DATA

(71) Applicant: MobilEye Vision Technologies Ltd., Jerusalem (IL)

(72) Inventor: Gabriel Bowers, Boulogne-Billancourt (FR)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 128 days.

(21) Appl. No.: 18/418,788

(22) Filed: Jan. 22, 2024

(65) Prior Publication Data

US 2024/0259714 A1     Aug. 1, 2024

Related U.S. Application Data

(60) Provisional application No. 63/520,148, filed on Aug. 17, 2023, provisional application No. 63/482,681, filed on Feb. 1, 2023.

(51) Int. Cl.
*H04N 25/78* (2023.01)
*H04N 25/57* (2023.01)
*H04N 25/63* (2023.01)

(52) U.S. Cl.
CPC ............ *H04N 25/78* (2023.01); *H04N 25/57* (2023.01); *H04N 25/63* (2023.01)

(58) Field of Classification Search
None
See application file for complete search history.

(56) References Cited

U.S. PATENT DOCUMENTS 5,086,343 A  *  2/1992  Cook ...................... H04N 25/63
                                                                348/257

* cited by examiner

*Primary Examiner* — Mark T Monk
(74) *Attorney, Agent, or Firm* — Shichrur & Co.

(57) ABSTRACT

For example, a pixel processor may be configured to receive signed digital pixel data corresponding to a plurality of pixels of a pixel array, the signed digital pixel data including a plurality of pixel-read values over a signed range, the plurality of pixel-read values including a plurality of negative pixel-read values over a negative sub-range, and a plurality of positive pixel-read values over a positive sub-range; and to generate unsigned digital pixel data over an unsigned range based on the signed digital pixel data, the unsigned digital pixel data including a first plurality of unsigned digital pixel values over a first sub-range of the unsigned range, and a second plurality of unsigned digital pixel values over a second sub-range of the unsigned range. For example, the first plurality of unsigned digital pixel values may be based on a black level scaling factor applied to the plurality of negative pixel-read values.

23 Claims, 13 Drawing Sheets

APPARATUS, SYSTEM, AND METHOD OF PROCESSING PIXEL DATA

CROSS REFERENCE

This application claims the benefit of, and priority from, U.S. Provisional Patent Application No. 63/482,681 entitled "APPARATUS, SYSTEM, AND METHOD OF PROCESSING PIXEL DATA", filed Feb. 1, 2023, and U.S. Provisional Patent Application No. 63/520,148 entitled "APPARATUS, SYSTEM, AND METHOD OF PROCESSING PIXEL DATA", filed Aug. 17, 2023, the entire disclosures of which are incorporated herein by reference.

BACKGROUND

An imaging device, e.g., a camera, may include an image sensor to capture one or more images, photos, videos, and/or the like.

The image sensor may include a pixel array including a plurality of pixels.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
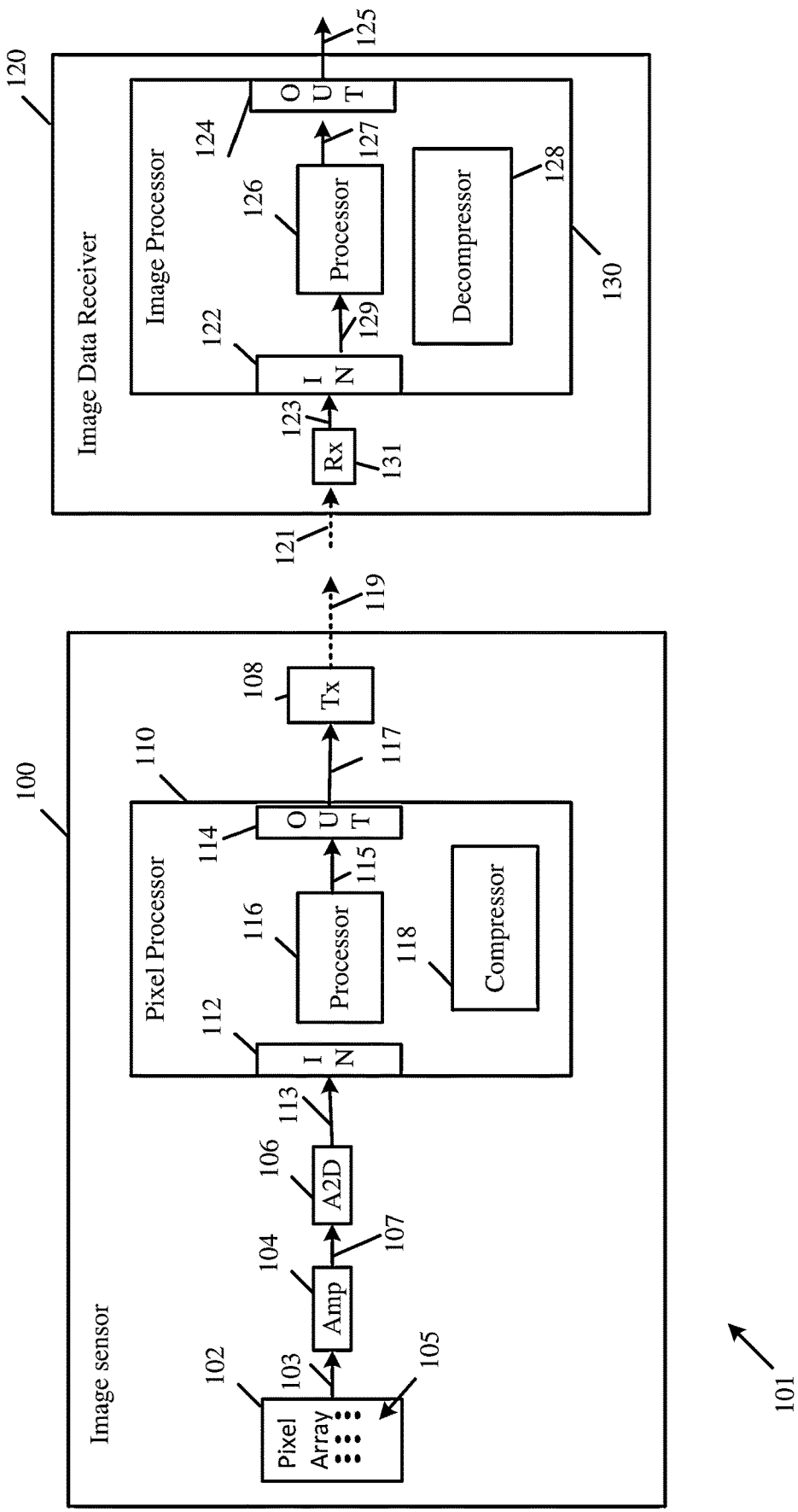
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

Some aspects may be used in conjunction with various devices and systems, for example, an electronic device, a computing device, an integrated computing device, an integrated chip, electronic circuitry, a processing device, an electronic device, a processor, a memory device, an imaging device, a digital camera device, a video device, a camera module, a medical imaging device, a mobile computer, a laptop computer, a notebook computer, a tablet computer, a handheld computer, a handheld device, a mobile or portable device, a consumer device, a Smartphone and the like.

The term "Integrated Circuit" (IC), as used herein, may relate to a set of one or more electronic circuits on a semiconductor material. For example, an electronic circuit may include electronic components and their interconnectors.

Reference is made to FIG. 1, which schematically illustrates a block diagram of a system 101, in accordance with some demonstrative aspects.

In some demonstrative aspects, system 101 may include an image sensor 100, e.g., as described below.

In some demonstrative aspects, image sensor 100 may include and/or may be implemented as an IC.

In some demonstrative aspects, the IC may include a complementary metal-oxide-semiconductor (CMOS) IC formed on a wafer.

In some demonstrative aspects, image sensor 100 may include a CMOS Image Sensor (CIS).

In some demonstrative aspects, image sensor 100 may be configured to capture, record, process, handle and/or store one or more images, photos, videos, movies, clips and/or the like.

In some demonstrative aspects, image sensor 100 may be included and/or implemented as part of an imaging device, e.g., as described below with reference to FIG. 12.

In one example, the imaging device may include, a digital camera, a medical imaging device, and/or the like.

In some demonstrative aspects, imaging devices may be used, for example, in a wide range of applications, for example, automotive applications, e.g., within an Autonomous Vehicle (AV), and/or the like.

In some demonstrative aspects, image sensor 100 may include analog circuitry, and/or digital circuitry, for example, to process, handle and/or store one or more images, photos, videos, movies, clips and/or the like.

In some demonstrative aspects, image sensor 100 may include a transmitter 108 to transmit image data 119, for example, to an image data receiver 120, e.g., an image processor, a display device, a memory, a communication interface, and/or the like.

In some demonstrative aspects, image sensor 100 may include a pixel array 102 including a plurality of pixels 105, e.g., as described below.

In some demonstrative aspects, the plurality of pixels 105 may be configured to sense and/or to capture an image, e.g., as described below.

In some demonstrative aspects, the plurality of pixels 105 may be configured to generate analog pixel data 103, e.g., as described below.

In some demonstrative aspects, pixel array 102 may be configured to capture photons corresponding to an image, and to convert the photons into analog pixel data 103, for example, to allow image sensor 100 to process the image and/or to output the image, for example, to image data receiver 120, e.g., an image processor, a display, a memory and/or the like.

In some demonstrative aspects, the analog pixel data 103 may include a plurality of analog pixel signals.

In some demonstrative aspects, a pixel 105 of the plurality of pixels 105, e.g., each pixel of the plurality of pixels, may be configured to capture incoming photons at an area of the pixel, and to convert the photons into an analog pixel signal.

In some demonstrative aspects, image sensor 100 may include at least one amplifier 104 configured to generate amplified analog pixel data 107, for example, based on the analog pixel data 103, e.g., as described below.

In some demonstrative aspects, amplifier 104 may be configured to amplify the analog pixel signals from the plurality of pixels 105.

In some demonstrative aspects, image sensor 100 may include one or more analog to digital converters (A2D) 106 configured to convert the amplified analog pixel data 107 into digital data, e.g., as described below.

In one example, pixel array 102 and/or A2D 106 may be implemented, for example, as part of the analog circuitry of image sensor 100.

In some demonstrative aspects, the digital data may include signed digital pixel data 113, for example, representing positive and negative pixel read-values, e.g., as described below.

In some demonstrative aspects, signed digital pixel data 113 may include signed integer digital data, e.g., representing positive and negative integer values.

In some demonstrative aspects, the signed digital pixel data 113 may include a plurality of pixel-read values, e.g., as described below.

In some demonstrative aspects, the signed digital pixel data 113 may include the plurality of pixel-read values, for example, over a signed range, e.g., as described below.

In some demonstrative aspects, the signed digital pixel data 113 may include a plurality of negative pixel-read values and a plurality of positive pixel-read values, e.g., as described below.

In some demonstrative aspects, the signed range may include a negative sub-range and a positive sub-range, e.g., as described below.

In some demonstrative aspects, the plurality of negative pixel-read values may be over the negative sub-range of the signed range, and the plurality of positive pixel-read values may be over the positive sub-range of the signed range, e.g., as described below.

In some demonstrative aspects, a pixel-read value of a pixel may include a signed integer, which may represent a level of light incident on the pixel.

In some demonstrative aspects, images read by the image sensor 100 may include noise, which may affect the captured pixel-read levels.

In some demonstrative aspects, the noise may affect, e.g., may increase or decrease, a pixel-read value of a pixel relative to a light incident on the pixel, e.g., over an integration period.

In some demonstrative aspects, a 'zero' pixel-read value of a pixel, e.g., at an output of A2D 106, e.g., at the pixel output, may be referred to as a 'black level' in the image.

In some demonstrative aspects, a positive pixel-read value of a pixel may represent different levels of light incident on the pixel.

In some demonstrative aspects, a negative pixel-read value of a pixel may represent noise over the "black level" in the pixel, for example, when light is not incident on the pixel. Accordingly, negative pixel-read values may be used, for example, for statistical measurements and/or for any other additional or alternative purpose.

In some demonstrative aspects, image sensor 100 may include a pixel processor 110, e.g., as described below.

In some demonstrative aspects, pixel processor 110 may be configured to process the signed digital pixel data 113 corresponding to the plurality of pixels 105, e.g., as described below.

In some demonstrative aspects, pixel processor 110 may be configured to generate unsigned digital pixel data 115, for example, based on the signed digital pixel data 113, e.g., as described below.

In some demonstrative aspects, pixel processor 110 may be configured to generate unsigned digital pixel data 115 over an unsigned range, for example, based on the signed digital pixel data 113, e.g., as described below.

For example, the unsigned digital pixel data 115 may be determined, for example, by applying an offset value to the signed integer digital data 113, e.g., to shift the signed integer digital data 113, for example, into the unsigned range.

For example, the offset value may be added to negative pixel-read values, for example, when converting the negative pixel-read values into signed integer values, for example, to avoid clipping of the negative pixel-read values.

For example, a 'zero' value of the pixel output, e.g., an output of pixel array 102, may be referred to the 'black level' in an image.

In one example, an image processing device receiving the image, e.g., image data receiver 120, may define a point where there is no light incident on the pixel as the 'black level'.

For example, as the image may be noisy, the image processing device, e.g., image data receiver 120, may determine that 'zero' light was incident on the pixel, for example, by averaging noise around the zero value, for example, over a group of pixels and/or over multiple samples of a same pixel.

In some demonstrative aspects, there may be a need to address one or more technical issues, disadvantages, and/or problems, for example, when determining the zero value based on the added offset, e.g., as described below.

In one example, determining the zero value by the added offset may reduce a range of light levels that can be communicated by an image sensor. For example, the range of light levels may be reduced, since part of the range of light levels may be occupied by negative pixel-read values, which have been offset by the offset value to the range of light levels, e.g., the unsigned range.

In one example, the values above the zero value, e.g., above the added offset, may represent different levels of light incident on the pixel, while the values below the zero value, e.g., values below the added offset, may be useful for statistical measurements and/or other purposes.

In some demonstrative aspects, image sensor 100 may be configured to provide a technical solution to support an increased range of digital light levels, e.g., as described below.

In some demonstrative aspects, image sensor 100 may be configured to utilize a reduced digital offset value, for example, to offset the negative pixel-read values, e.g., representing a black level, for example, by compressing the data below the 'black level', e.g., as described below.

In some demonstrative aspects, image sensor 100 may be configured to provide the increased range of digital light levels supported within an image, for example, by reducing the allocated range for 'black' (negative) pixels within the image, e.g., as described below.

In some demonstrative aspects, image sensor 100 may be configured to rescale the negative pixel-read values ("black data"), for example, by a known factor (a black level scaling factor), for example, to introduce quantization to the negative pixel data, e.g., as described below.

In some demonstrative aspects, image sensor 100 may be configured to scale the negative pixel-read values, for example, in a way which may maintain the ability of a receiving image processing device, e.g., image data receiver 120, to identify pixels that were captured at the 'zero' level, for example, representing no light received, e.g., as described below.

In some demonstrative aspects, image sensor 100 may be configured to determine a level of scaling, e.g., reduction, compression and/or the like, to be applied to the data below the 'black level', for example, based on one or more parameters related to a noise level of signed digital pixel data 113, e.g., as described below.

In some demonstrative aspects, the noise level may be determined, for example, based on a sensor integration parameter, a gain parameter, and/or chip temperature, e.g., as described below.

In other aspects, the noise level may be determined based on any other additional or alternative information.

In some demonstrative aspects, a receiving image processing device, e.g., image data receiver 120, may be configured to process the unsigned digital pixel data 115, for example, to rescale (uncompress) the black level, for example, based on the black level scaling factor, e.g., as described below.

In some demonstrative aspects, pixel processor 110 may include an input 112 to receive the singed digital pixel data 113 corresponding to the plurality of pixels 105 of the pixel array 102, e.g., as described below.

In some demonstrative aspects, the signed digital pixel data 113 may include a plurality of pixel-read values over a signed range, e.g., as described below.

In some demonstrative aspects, the signed range may include a negative sub-range, e.g., as described below.

In some demonstrative aspects, the signed range may include a positive sub-range, e.g., as described below.

In some demonstrative aspects, the signed range may include a plurality of signed levels, e.g., as described below.

In some demonstrative aspects, the negative range may include a plurality of negative levels, and/or the positive range may include a plurality of positive levels, e.g., as described below.

In some demonstrative aspects, the plurality of pixel-read values in signed digital pixel data 113 may include a plurality of negative pixel-read values and a plurality of positive pixel-read values, e.g., as described below.

In some demonstrative aspects, the plurality of negative pixel-read values may be over the negative sub-range of the signed range, e.g., as described below.

In some demonstrative aspects, the plurality of positive pixel-read values may be over the positive sub-range of the signed range, e.g., as described below.

In some demonstrative aspects, pixel processor 110 may include a processor 116 configured to generate the unsigned digital pixel data 115 over an unsigned range, for example, based on the signed digital pixel data 113, e.g., as described below.

In some demonstrative aspects, the unsigned range may have a digital offset with respect to the signed range, e.g., as described below.

In some demonstrative aspects, a size of the unsigned range may be smaller than a size of the signed range, e.g., as described below.

In some demonstrative aspects, pixel processor 110 may be configured to apply a digital offset to the pixel values of signed digital pixel data 113, e.g., as described below.

In some demonstrative aspects, the unsigned digital pixel data 115 may include a first plurality of unsigned digital pixel values over a first sub-range of the unsigned range, and a second plurality of unsigned digital pixel values over a second sub-range of the unsigned range, e.g., as described below.

In some demonstrative aspects, the first sub range of the unsigned range may include a first plurality of unsigned levels, e.g., as described below.

In some demonstrative aspects, the second sub range of the unsigned range may include a second plurality of unsigned levels, e.g., as described below.

In some demonstrative aspects, the first plurality of unsigned digital pixel values in unsigned digital pixel data 115 may be based, for example, on the plurality of negative pixel-read values of signed digital pixel data 113, e.g., as described below.

In some demonstrative aspects, the second plurality of unsigned digital pixel values in unsigned digital pixel data 115 may be based, for example, on the plurality of positive pixel-read values of signed digital pixel data 113, e.g., as described below.

In some demonstrative aspects, the first plurality of unsigned digital pixel values may be based on a black level scaling factor applied to the plurality of negative pixel-read values in signed digital pixel data 113, e.g., as described below.

In some demonstrative aspects, the black level scaling factor may be less than 1, e.g., as described below.

In some demonstrative aspects, the black level scaling factor may be less than 0.5, e.g., as described below.

In some demonstrative aspects, the black level scaling factor may be less than 0.25, e.g., as described below.

In other aspects, any other black level scaling factor may be implemented.

In some demonstrative aspects, the second plurality of unsigned digital pixel values may be based on the plurality of positive pixel-read values, e.g., as described below.

In some demonstrative aspects, pixel processor 110 may include an output 114 to output processed pixel data 117 based on the unsigned digital pixel data 115, e.g., as described below.

In some demonstrative aspects, the black level scaling factor may be different than a light level scaling factor, which may represent a factor between a size of the positive sub-range of the signed range and a size of the second sub-range of the unsigned range, e.g., as described below.

In some demonstrative aspects, a count of the plurality of unsigned levels in the first sub-range of the unsigned range may be based, for example, on the black level scaling factor applied to a count of the plurality of negative levels in the signed range, e.g., as described below.

In some demonstrative aspects, a count of the plurality of unsigned levels in the second sub-range of the unsigned range may be based, for example, on the light level scaling factor applied to a count of the plurality of positive levels in the signed range, e.g., as described below.

In some demonstrative aspects, the black level scaling factor may be less than the light level scaling factor, e.g., as described below.

In some demonstrative aspects, the black level scaling factor may be less than half of the light level scaling factor, e.g., as described below.

In some demonstrative aspects, the light level scaling factor may be equal to 1, e.g., as described below.

In some demonstrative aspects, the light level scaling factor may be less than 1, e.g., as described below.

In other aspects, any other light level scaling factor may be implemented.

In some demonstrative aspects, a size of the first sub-range of the unsigned range may be based, for example, on the black level scaling factor applied to a size of the negative sub-range of the signed range, e.g., as described below.

In some demonstrative aspects, the size of the first sub-range of the unsigned range may be smaller than the size of the negative sub-range of the signed range, for example, when the black level scaling factor is less than one, e.g., as described below.

In some demonstrative aspects, the size of the first sub-range of the unsigned range may be smaller than a size of the second sub-range of the unsigned range, e.g., as described below.

In some demonstrative aspects, the plurality of pixel-read values may be represented over a plurality of signed levels in the signed range, e.g., as described below.

In some demonstrative aspects, the unsigned digital pixel data 115 may be represented over a plurality of unsigned levels in the unsigned range, e.g., as described below.

In some demonstrative aspects, a count of the plurality of unsigned levels in the unsigned range may be less than a count of the plurality of signed levels in the signed range, for example, when the black level scaling factor is less than one and/or when the light level scaling factor is less than one, e.g., as described below.

In some demonstrative aspects, the plurality of negative pixel-read values may be represented over a plurality of negative levels in the negative sub-range of the signed range, e.g., as described below.

In some demonstrative aspects, the first plurality of unsigned digital pixel values may be represented over a plurality of unsigned levels in the first sub-range of the unsigned range, e.g., as described below.

In some demonstrative aspects, a count of the plurality of unsigned levels in the first sub-range of the unsigned range may be less than a count of the plurality of negative levels in the negative sub-range of the signed range, for example, when the black level scaling factor is less than one, e.g., as described below.

In some demonstrative aspects, processor 116 may be configured to generate the second plurality of unsigned digital pixel values, for example, by applying a digital offset to the plurality of positive pixel-read values, e.g., as described below.

In some demonstrative aspects, the light level scaling factor may be 1. For example, processor 116 may be configured to generate the second plurality of unsigned digital pixel values over the second sub-range of the unsigned range, for example, based directly on the positive digital pixel read values in the signed digital pixel data 113, e.g., without scaling.

In some demonstrative aspects, a count of unsigned levels in the second sub-range of the unsigned range may be equal to a count of the plurality of positive levels in the positive sub-range of the signed range, e.g., when the light level scaling factor is 1.

In some demonstrative aspects, a size of the second-sub range of the unsigned range may be equal to the size of the positive range of the signed range, e.g., when the light level scaling factor is 1.

In other aspects, the light level scaling factor may be different than 1, e.g., less than 1. For example, processor 116 may be configured to generate the second plurality of unsigned digital pixel values over the second sub-range of the unsigned range, for example, by applying the light level scaling factor to the plurality of positive pixel-read values of signed digital pixel data 113.

In other aspects, any other black level scaling factor and/or light level scaling factor may be implemented.

In some demonstrative aspects, processor 116 may be configured to generate the first plurality of unsigned digital pixel values, for example, based on the digital offset and the black level scaling factor, e.g., as described below.

In some demonstrative aspects, processor 116 may be configured to generate a plurality of scaled negative read values, for example, by applying the black level scaling factor to the plurality of negative pixel-read values, e.g., as described below.

In some demonstrative aspects, processor 116 may be configured to generate the first plurality of unsigned digital pixel values, for example, by applying the digital offset to the plurality of scaled negative read values, e.g., as described below.

In some demonstrative aspects, processor 116 may be configured to generate the first plurality of unsigned digital pixel values, for example, based on a product of the negative pixel-read values multiplied by the black level scaling factor, e.g., as described below.

In some demonstrative aspects, processor 116 may be configured to determine the black level scaling factor and/or the light level scaling factor based on one or more criteria corresponding to one or more elements of image sensor 100, e.g., as described below.

In some demonstrative aspects, processor 116 may be configured to determine the black level scaling factor, for example, based on one or more image sensor parameters of image sensor 100 including the pixel processor 110, e.g., as described below.

In some demonstrative aspects, processor 116 may be configured to determine the black level scaling factor, for example, based on an integration parameter of image sensor 100, e.g., as described below.

In some demonstrative aspects, processor 116 may be configured to determine the black level scaling factor, for example, based on a temperature of pixel array 102, e.g., as described below.

In some demonstrative aspects, processor 116 may be configured to determine the black level scaling factor, for example, based on a gain of amplifier 104, e.g., as described below.

In other aspects, processor 116 may be configured to determine the black level scaling factor and/or the light level scaling factor based on any other additional and/or alternative parameter and/or criterion.

In some demonstrative aspects, processor 116 may be configured to adjust the black level scaling factor, for example, based on a change in one or more image sensor parameters, e.g., as described below.

In some demonstrative aspects, processor 116 may be configured to determine a first black level scaling factor, for example, based on a first configuration of the image sensor parameters, e.g., as described below.

In some demonstrative aspects, processor 116 may be configured to determine a second black level scaling factor, for example, based on a second configuration of the image sensor parameters, e.g., as described below.

In some demonstrative aspects, the second black level scaling factor may be different from the first black level scaling factor, and the second configuration of the image sensor parameters may be different from the first configuration of the image sensor parameters, e.g., as described below.

In some demonstrative aspects, pixel processor 110 may be configured to provide the processed pixel data 117 including black level scaling information configured to indicate the black level scaling factor, e.g., as described below.

In some demonstrative aspects, pixel processor 110 may be configured to provide the processed pixel data 117, for example, based on data compression of the unsigned digital pixel data 115, e.g., as described below.

In some demonstrative aspects, pixel processor 110 may be configured to provide the processed pixel data 117 including data compression information to indicate a configuration of the data compression, e.g., as described below.

In some demonstrative aspects, the data compression may include a piecewise linear companding, e.g., as described below.

In other aspects, the data compression may include any other additional and/or alternative type of data compression.

In some demonstrative aspects, pixel processor 110 may include a compressor 118 configured to perform the data compression, e.g., as described below.

In some demonstrative aspects, compressor 118 may include a piecewise linear compander configured to perform the piecewise linear companding, e.g., as described below.

In other aspects, compressor 118 any include other additional or alternative type of compressor and/or compander.

In some demonstrative aspects, transmitter 108 may transmit image data 119 including processed pixel data 117, for example, to be processed by image data receiver 120, e.g., as described below.

In some demonstrative aspects, image data receiver 120 may include a receiver (Rx) 131 to receive image data 121 including input pixel data 123 to be processed by the image data receiver 120.

In one example, the input pixel data 123 in image data 121 may include, or may be based on, the image data 119 including the processed pixel data 117.

In some demonstrative aspects, transmitter 108 and/or receiver 131 may include any suitable communication interface to communicate data over any suitable communication link. In one example, transmitter 108 and/or receiver 131 may be configured to communicate over a wired link between image sensor 100 and image data receiver 120. In another example, transmitter 108 and/or receiver 131 may be configured to communicate over a wireless link between image sensor 100 and image data receiver 120.

In some demonstrative aspects, image data receiver 120 may be configured to output processed image data 125, for example, based on the input pixel data 123, e.g., as described below.

In some demonstrative aspects, image data receiver 120 may include an image processor 130 configured to process the input pixel data 123, e.g., as described below.

In some demonstrative aspects, image processor 130 may include an input 122 to receive the input pixel data 123, e.g., as described below.

In some demonstrative aspects, input pixel data 123 may include first unsigned digital pixel data 129, e.g., as described below.

In some demonstrative aspects, the first unsigned digital pixel data 129 may include a first plurality of input values below a first black level, e.g., as described below.

In some demonstrative aspects, the first unsigned digital pixel data 129 may include a second plurality of input values above the first black level, e.g., as described below.

For example, the first unsigned digital pixel data 129 may include, or may be based on, the unsigned digital pixel data 115, e.g., as described above.

In some demonstrative aspects, image processor 130 may include a processor 126 configured to process the input pixel data 123, e.g., as described below.

In some demonstrative aspects, processor 126 may be configured to process the first unsigned digital pixel data 129, e.g., as described below.

In some demonstrative aspects, processor 126 may be configured to generate second unsigned digital pixel data 127, for example, based on the first unsigned digital pixel data 129, e.g., as described below.

In some demonstrative aspects, the second unsigned digital pixel data 127 may include a first plurality of processed values below a second black level, e.g., as described below.

In some demonstrative aspects, the second unsigned digital pixel data 127 may include a second plurality of processed values above the second black level, e.g., as described below.

In some demonstrative aspects, the second black level may be greater than the first black level, e.g., as described below.

In some demonstrative aspects, the first plurality of processed values in second unsigned digital pixel data 127 may be based on an inverse of a black level scaling factor applied to the first plurality of input values in first unsigned digital pixel data 129, e.g., as described below.

In some demonstrative aspects, the black level scaling factor may be less than 1, e.g., as described below.

In one example, the black level scaling factor applied to the first plurality of input values in first unsigned digital pixel data 129, e.g., by processor 126, may include, or may be based on, the black level scaling factor applied to the plurality of negative pixel-read values in signed digital pixel data 113, e.g., by processor 116.

In some demonstrative aspects, processor 126 may be configured to process the input pixel data 123 to identify black level scaling information to indicate the black level scaling factor, e.g., as described below.

For example, the input pixel data 123 may include the black level scaling information in processed pixel data 117, e.g., from image sensor 100, for example, to indicate the black level scaling factor applied by processor 116, e.g., as described above.

In some demonstrative aspects, the second plurality of processed values in second unsigned digital pixel data 127 may be based on a digital offset applied to the second plurality of input values in first unsigned digital pixel data 129, e.g., as described below.

In some demonstrative aspects, the digital offset applied by processor 126 may be based on the inverse of the black level scaling factor, e.g., as described below.

In some demonstrative aspects, image processor 130 may include an output 124 to output processed image data 125, for example, based on the second unsigned digital pixel data 127, e.g., as described below.

In some demonstrative aspects, the digital offset applied by processor 126 may be based, for example, on the first black level of the first unsigned digital pixel data 129, e.g., as described below.

In some demonstrative aspects, the digital offset applied by processor 126 may be based, for example, on a product of the first black level of the first unsigned digital pixel data 129 multiplied by the inverse of the black level scaling factor, e.g., as described below.

In some demonstrative aspects, the digital offset applied by processor 126 may be based, for example, on a difference between a first value and a second value, e.g., as described below.

In some demonstrative aspects, the first value may include the product of the first black level of the first unsigned digital pixel data 129 multiplied by the inverse of the black level scaling factor, e.g., as described below.

In some demonstrative aspects, the second value may include the first black level of the first unsigned digital pixel data 129, e.g., as described below.

In other aspects, the first value and/or the second value may be determined based on any other definition, criteria and/or calculation.

In some demonstrative aspects, the digital offset applied by processor 126 may be based, for example, on the first black level of the first unsigned digital pixel data 129 and the second black level of the second unsigned digital pixel data 127, e.g., as described below.

In some demonstrative aspects, the digital offset applied by processor 126 may be based, for example, on a difference between the second black level of the second unsigned digital pixel data 127 and the first black level of the first unsigned digital pixel data 129, e.g., as described below.

In other aspects, the digital offset applied by processor 126 may be determined based on any other definition, criteria and/or calculation.

In some demonstrative aspects, the second black level of the second unsigned digital pixel data 127 may be based, for example, on a product of the first black level of the first unsigned digital pixel data 129 multiplied by the inverse of the black level scaling factor, e.g., as described below.

In other aspects, the second black level of the second unsigned digital pixel data 127 may be determined based on any other definition, criteria and/or calculation.

In some demonstrative aspects, processor 126 may be configured to generate the first plurality of processed values in second unsigned digital pixel data 127, for example, based on a product of the first plurality of input values in first unsigned digital pixel data 129 multiplied by the inverse of the black level scaling factor, e.g., as described below.

In other aspects, processor 126 may be configured to generate the first plurality of processed values in second unsigned digital pixel data 127, for example, based on any other additional or alternative calculation and/or operation applied to the first plurality of input values in first unsigned digital pixel data 129.

In some demonstrative aspects, the input pixel data 123 may include data compression information to indicate a configuration of a data compression, which has been implemented, for example, to generate the pixel data 117, e.g., as described below.

For example, the input pixel data 123 may include, or may be based on, the data compression information in processed pixel data 117, e.g., from image sensor 100, for example, to indicate the configuration of the data compression applied by compressor 118, e.g., as described above.

In some demonstrative aspects, processor 126 may be configured to generate the second unsigned digital pixel data 127, for example, based on the data compression information in the input pixel data 123, e.g., as described below.

In some demonstrative aspects, processor 126 may be configured to generate de-compressed digital pixel data, for example, based on a data decompression of the first unsigned digital pixel data, for example, according to the data compression information in the input pixel data 123, e.g., as described below.

In some demonstrative aspects, processor 126 may be configured to generate the second unsigned digital pixel data 127, for example, based on the de-compressed digital pixel data, e.g., as described below.

In some demonstrative aspects, the data decompression may include a piecewise linear decompanding, e.g., as described below.

In some demonstrative aspects, the data decompression may include a piecewise linear de-companding, for example, based on the piecewise linear companding performed by compander 118, e.g., as described below.

In other aspects, processor 126 may be configured to generate the second unsigned digital pixel data 127, for example, based on any other additional or alternative data decompression mechanism, e.g., as described below.

In some demonstrative aspects, image processor 130 may include a decompressor 128 configured to perform the data decompression, for example, based on the data compression information in input pixel data 123, e.g., as described below.

In some demonstrative aspects, decompressor 128 may include a piecewise linear decompander 128 configured to perform piecewise linear decompanding, for example, based on piecewise linear companding information in input pixel data 123, e.g., as described below.

In other aspects, decompressor 128 may be configured to implement any other additional or alternative type of data decompression.

Figure 2:
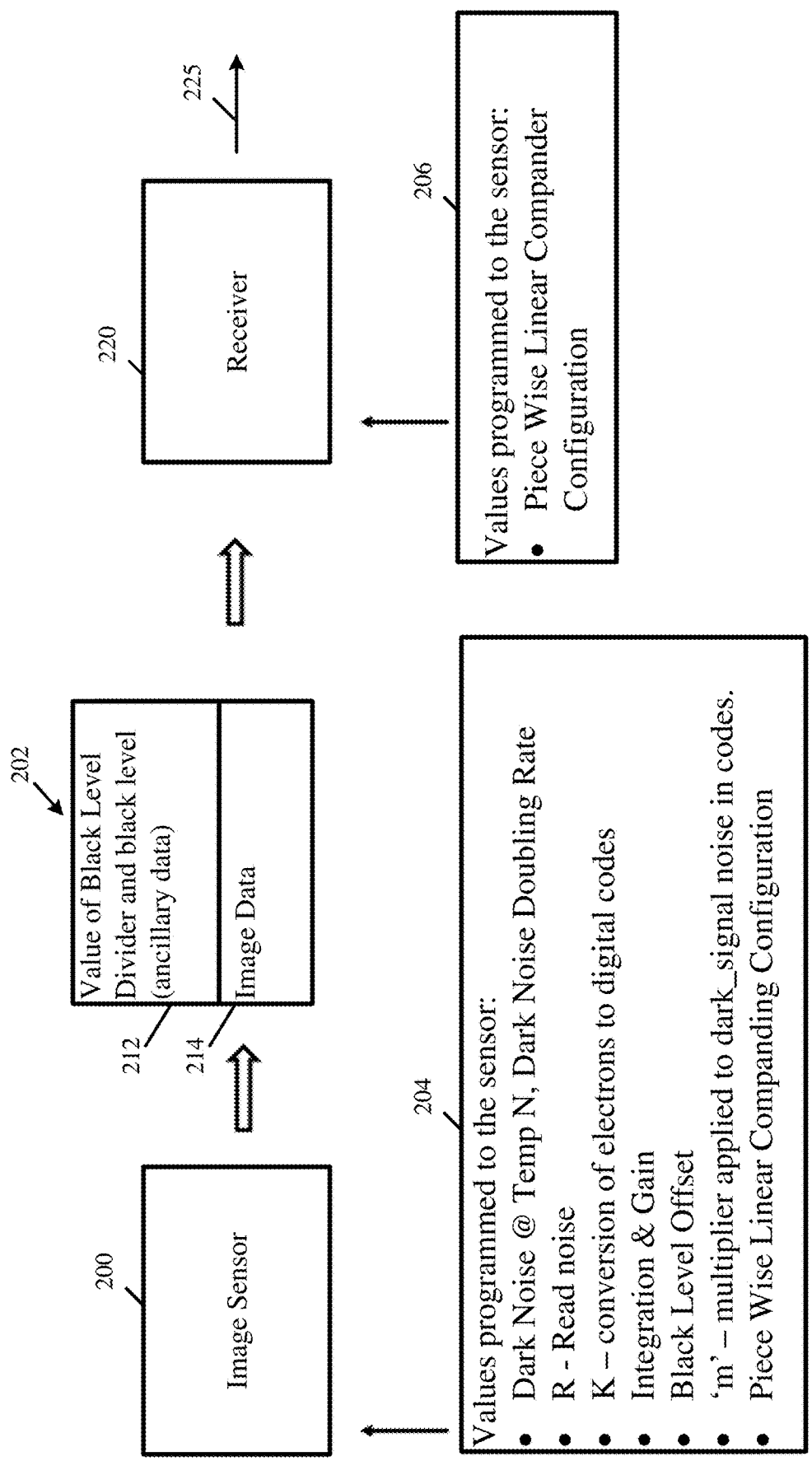
FIG. 2 is a schematic illustration of a system, in accordance with some demonstrative aspects.

Reference is made to FIG. 2, which schematically illustrates a block diagram of a system 201, in accordance with some demonstrative aspects.

In some demonstrative aspects, as shown in FIG. 2, system 201 may include an image sensor 200, and an image data receiver 220. For example, image sensor 100 (FIG. 1) may include one or more elements of image sensor 200, and/or may perform one or more operations and/or functionalities of image sensor 200, and/or image data receiver 120 (FIG. 1) may include one or more elements of image data receiver 220 and/or may perform one or more operations and/or functionalities of image data receiver 220.

In some demonstrative aspects, as shown in FIG. 2, image sensor 200 may be configured to send image data 202 to image data receiver 220.

In some demonstrative aspects, image data 202 may include, or may be based on, image data 119 (FIG. 1).

In some demonstrative aspects, as shown in FIG. 2, image data 202 may include image information 214.

In some demonstrative aspects, image information 214 may include, or may be based on, unsigned digital pixel data 115 (FIG. 1).

In some demonstrative aspects, as shown in FIG. 2, image data 202 may include black level scaling information 212 to indicate a black level scaling factor, e.g., 'black level divider' data.

For example, the black level scaling factor may include a black level divider value, for example, which may be calculated by the image sensor 200, e.g., as described above.

In some demonstrative aspects, as shown in FIG. 2, black level scaling information 212 may be provided in the form of ancillary data, which may be attached to image information 214, for example, before or after image data 202 is output.

In some demonstrative aspects, as shown in FIG. 2, image data receiver 220 may receive the image data 202 including the black level scaling information 212 and the image information 214.

In some demonstrative aspects, as shown in FIG. 2, image data receiver 220 may generate processed image data 225, for example, based on the black level scaling information 212 and the image information 214.

In some demonstrative aspects, as shown in FIG. 2, one or more settings of one or more parameters 204 may be programmed into image sensor 200, for example, to determine and/or configure the black level scaling factor, and/or the image data 202.

In one example, as shown in FIG. 2, the one or more parameters 204 may include, for example, one or more, e.g., some or all, of the flowing parameters:

a dark noise at a temperature N, and/or a Dark Noise Doubling Rate of image sensor 200.

a read noise of image sensor 200.

a conversion factor, denoted K, representing a conversion of electrons to digital codes.

integration and/or gain information of image sensor 200.

a black level offset.

a multiplier, denoted m, to be applied to dark signal noise in codes.

a piecewise linear companding configuration information.

In other aspects, any other values of any other additional and/or alternative parameters be programmed into image sensor 200, for example, to determine and/or configure the black level scaling factor, and/or the image data 202.

In some demonstrative aspects, as shown in FIG. 2, one or more settings of one or more parameters 206 may be programmed into image data receiver 220, for example, to determine and/or configure processed image data 225.

In some demonstrative aspects, as shown in FIG. 2, the one or more parameters 206 may include data compression information, which may be programed to the image data receiver 220, e.g., if used.

In some demonstrative aspects, the data compression information may include piece-wise linear compander configuration.

In other aspects, the data compression information may include any other additional and/or alternative information.

In other aspects, one or more parameters of the data compression information may be provided from the image sensor 200 to the image data receiver 220, for example, as part of the image date 202, e.g., as described above.

Figure 3:
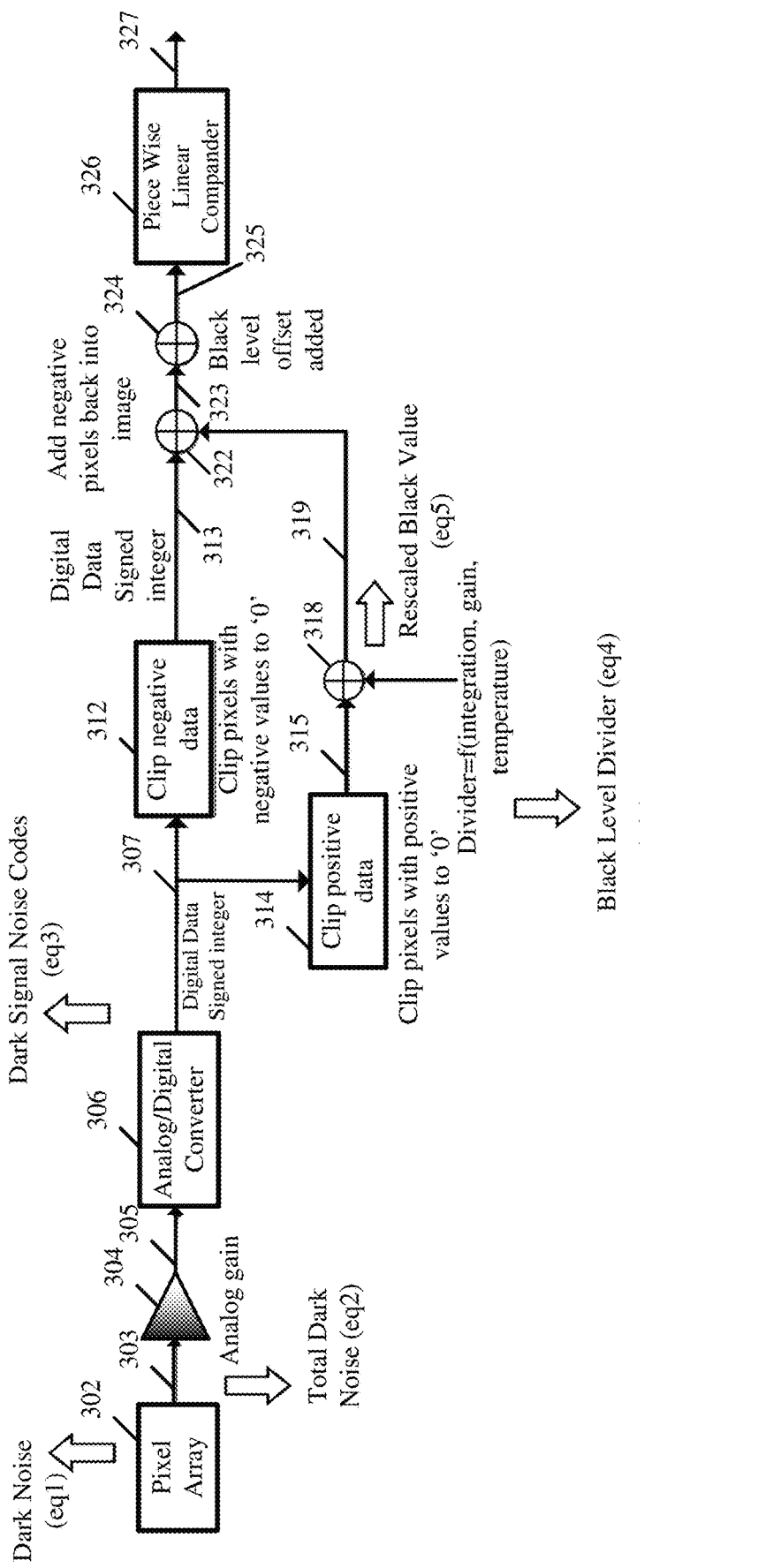
FIG. 3 is a schematic illustration of an image sensor, in accordance with some demonstrative aspects.

Reference is made to FIG. 3, which schematically illustrates an image sensor 300, in accordance with some demonstrative aspects. For example, image sensor 100 (FIG. 1) may include one or more elements of image sensor 300, and/or may perform one or more operations and/or functionalities of image sensor 300.

In some demonstrative aspects, as shown in FIG. 3, image sensor 300 may include a pixel array 302 including a plurality of pixels configured to generate analog pixel data 303.

In some demonstrative aspects, as shown in FIG. 3, image sensor 300 may include an amplifier 304 configured to generate amplified analog pixel data 305, for example, based on the analog pixel data 303.

In some demonstrative aspects, as shown in FIG. 3, image sensor 300 may include an A2D converter 306 configured to convert the amplified analog pixel data 305 into signed digital pixel data 307 including, for example, a plurality of pixel-read values over a signed range, e.g., as described above.

In some demonstrative aspects, signed digital pixel data 307 may include a plurality of negative pixel-read values over a negative sub-range of a signed range, and a plurality of positive pixel-read values over a positive sub-range of the signed range, e.g., as described above.

In some demonstrative aspects, as shown in FIG. 3, image sensor 300 may include a first clipper 312 configured to clip negative pixel-read values from signed digital pixel data 307, e.g., to clip pixels with negative values to '0'.

In some demonstrative aspects, as shown in FIG. 3, first clipper 312 may output a plurality of positive pixel-read values 313 of signed digital pixel data 307, e.g., as digital data positive integer values.

In some demonstrative aspects, as shown in FIG. 3, image sensor 300 may include a second clipper 314 configured to clip positive pixel-read values from signed digital pixel data 307, e.g., to clip pixels with positive values to '0'.

In some demonstrative aspects, as shown in FIG. 3, second clipper 314 may output a plurality of negative pixel-read values 315 of signed digital pixel data 307, e.g., as digital data negative integer values.

In some demonstrative aspects, as shown in FIG. 3, image sensor 300 may include a scaler 318 configured to scale the plurality of negative pixel-read values 315 by a black level scaling factor.

In one example, scaler 318 may include a multiplier, which may be configured to multiply the plurality of negative pixel-read values 315, for example, by the black level scaling factor.

In another example, scaler 318 may be configured to divide the plurality of negative pixel-read values 315, for example, by a value (Black Level Divider), which may be an inverse of the black level scaling factor, e.g., as described below.

In some demonstrative aspects, the black level scaling factor value may be determined, for example, based on one or more factors, e.g., a described above.

In some demonstrative aspects, the black level scaling factor value may be determined, for example, based on one or more factors affecting a noise generated in the image, e.g., the integration parameter, the gain parameter, the temperature parameter, and/or any other additional or alternative parameter, e.g., as described above.

In some demonstrative aspects, as shown in FIG. 3, scaler 318 may be configured to output scaled negative read values 319, for example, based on the black level scaling factor applied to the plurality of negative pixel-read values 315.

In some demonstrative aspects, as shown in FIG. 3, image sensor 300 may apply the scaler 318, for example, only to pixels with a negative value, e.g., only to the plurality of negative pixel-read values 315.

In some demonstrative aspects, as shown in FIG. 3, a result of the scaler 318 may rescale negative pixel-read values 315 into a range, which may fit into an allocated 'black level' range, e.g., including the negative data, in the output image.

In some demonstrative aspects, as shown in FIG. 3, the values of pixels with negative data, e.g., the values of negative pixel-read values 315, may be replaced with rescaled values generated by the scaler 318, e.g., with scaled negative read values 319.

In some demonstrative aspects, as shown in FIG. 3, image sensor 300 may include a combiner 322, e.g., an adder, configured to generate a plurality of signed pixel values 323, for example, by combining, e.g., adding, the scaled negative read values 319 and the positive pixel-read values 313.

In some demonstrative aspects, as shown in FIG. 3, image sensor 300 may include a shifter 324 configured to apply a digital offset to the plurality of signed pixel values 323, for example, to generate a plurality of unsigned pixel values 325.

In some demonstrative aspects, as shown in FIG. 3, the digital offset may be applied, for example, to add a 'black level' pedestal to the image, e.g., after the rescaling.

In some demonstrative aspects, pixels with values that are negative after the 'black level' pedestal is added, may be clipped to zero.

In some demonstrative aspects, as shown in FIG. 3, the plurality of unsigned pixel values 325, e.g., after the digital offset is applied, may be treated as unsigned data, e.g., data without negative values.

In some demonstrative aspects, the plurality of unsigned pixel values 325 may include a first plurality of values below a black level and a second plurality of values above the black level.

Figure 4:
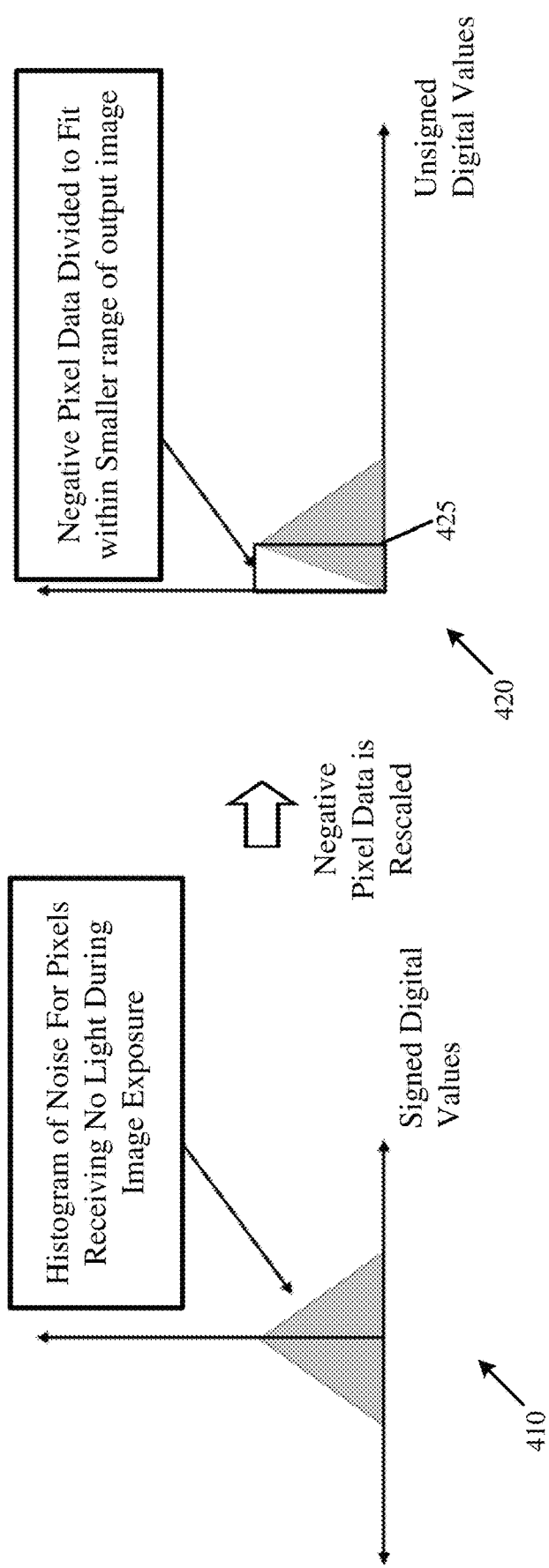
FIG. 4 is a schematic illustration of a first histogram of digital pixel values mapped over a signed range of values, and a second histogram of the of digital pixel values mapped over an unsigned range of values, in accordance with some demonstrative aspects.

Reference is made to FIG. 4, which schematically illustrates a first histogram 410 of digital pixel values mapped over a signed range of values, and a second histogram 420 of the of digital pixel values mapped over an unsigned range of values, in accordance with some demonstrative aspects.

In some demonstrative aspects, as shown in FIG. 4, the first histogram 410 and the second histogram 420 may depict a visual representation of a process of negative pixel-data rescaling, e.g., as described above with reference to FIG. 3.

In some demonstrative aspects, as shown in FIG. 4, the first histogram 410 may represent a histogram of noise for pixels receiving no light during image exposure, e.g., before rescaling. For example, the first histogram 410 may represent the noise for the pixels receiving no light, e.g., in signed digital pixel data 307 (FIG. 3) as described above with reference to FIG. 3.

As shown in FIG. 4, the first histogram 410 includes a plurality of negative pixel-read values over a negative sub-range of a signed range, and a plurality of positive pixel-read values over a positive sub-range of the signed range.

In some demonstrative aspects, as shown in FIG. 4, the second histogram 420 may represent a histogram of the noise for the pixels receiving no light, for example, after the rescaling process, which may rescale the negative pixel data, for example, to fit within a smaller range of an output image. For example, the second histogram 420 may represent the noise for the pixels receiving no light, e.g., in unsigned digital pixel data 325 (FIG. 3) as described above with reference to FIG. 3

In some demonstrative aspects, as shown in FIG. 4, for example, as a result of the rescaling process, the negative pixel data may fit within a range allocated by a 'black level offset'.

In some demonstrative aspects, as shown in FIG. 4, the second histogram 420 may include a plurality of unsigned digital pixel values including a first plurality of unsigned values below a black level 425, and a second plurality of unsigned values above the black level 425.

Referring back to FIG. 3, in some demonstrative aspects, image sensor 300 may be configured to define the black level scaling factor value of divider 318, for example, based on one or more parameters, e.g., known parameters, preconfigured parameters, and/or measured/determined parameters, and/or inputs from image sensor 300, e.g., as described below.

In one example, image sensor 300 may define the black level scaling factor value based on one or more parameters, e.g., including one or more parameters of the noise affecting the image sensor 300, e.g., as follows:

EQN1: The 'dark noise' in electrons, which may be determined based on the following values:

$$\text{dark\_noise} = \text{integration} * \text{dark\_current\_at\_temp\_n\_per\_second} * 2^{((\text{temp\_f}-\text{temp\_n})/\text{doubling\_rate})}$$

wherein:
Temperature—Temperature of the sensor, e.g., as measured by on-chip temp sensors.
Integration (ms)—Programmed to the sensor and/or provided to the equation.
Dark current at temp n—This may be based on the measured dark current at a known temperature.
Doubling-rate—The doubling-rate of the dark current.

EQN2: The 'total dark' noise in the case where no light is incident on the pixel:

$$\text{Total\_dark\_noise\_electrons} = (\text{read\_noise}^2 + DSNU^2 + \text{dark\_noise})^{0.5}$$

Wherein:
Read_noise may be the noise generated as the charge present in the pixel is transferred to the output of the sensor ADC.
DSNU is the fixed offset that may exist in a pixel when no light is present.

EQN3: The dark signal in codes after the 'Analog/Digital Converter' (ADC) 306 may be determined, e.g., as:

$$\text{dark\_signal\_noise\_codes} = \text{dark\_noise\_electrons} * K * \text{gain}$$

wherein:
"dark noise electrons" may be determined, for example, from EQN2.
K—is the rate of conversion of 'electrons' to digital codes.
Gain—may include any multiplication of the signal generated from the electrons accumulated within the sensor pixel.

EQN4: Black Level Divider—e.g., as described with respect to FIG. 3.

$$\text{Black Level Divider} = \text{'black level offset'} / (m * \text{dark\_signal\_noise\_codes})$$

The 'black level offset' may include the allowed output level as shown in FIG. 3.
wherein 'm' represents the multiplier added to the dark_signal_noise_codes.

EQN5: Equation applied to 'negative' data:

$$\text{Rescaled black Value} = (\text{Digital\_value} / \text{Black Level Divider})$$

In other aspects, image sensor 300 may define the black level scaling factor value based on one or more additional and/or alternative parameters, criteria and/or equations.

In some demonstrative aspects, as shown in FIG. 3, image sensor 300 may include a compressor 326 configured to compress the plurality of unsigned pixel values 325, e.g., as described below.

In some demonstrative aspects, as shown in FIG. 3, compressor 326 may include a piecewise linear compander 326, e.g., with a 30$b$ Input and a 12$b$ Output. In other aspects, the piecewise linear compander may be defined according to any other configuration.

In some demonstrative aspects, compressor 326 may generate compressed unsigned digital pixel data 327, for example, based on the plurality of unsigned pixel values 325.

In other aspects, compressor 326 may include any other additional or alternative type of data compressor.

In some demonstrative aspects, as shown in FIG. 3, pixel data after the black level offset may be added, e.g., to generate the plurality of unsigned pixel values 325, and may further go through a data reduction block, e.g., by piecewise linear compander 326, for example, to further reduce the data set, e.g., to further reduce the size of the data representing the plurality of unsigned pixel values 325.

In one example, piecewise linear compander 326 may be implemented as data reduction block, which may be suitable, for example, for many types of image sensors, e.g., High Definition Rate (HDR) sensors, or the like.

In another example, piecewise linear compander 326 may be configured to reduce the data size of unsigned pixel values 325, for example, based on applying a plurality of varying levels of reduction, which may be defined by a plurality of knee-points, e.g., as described below.

Figure 5:
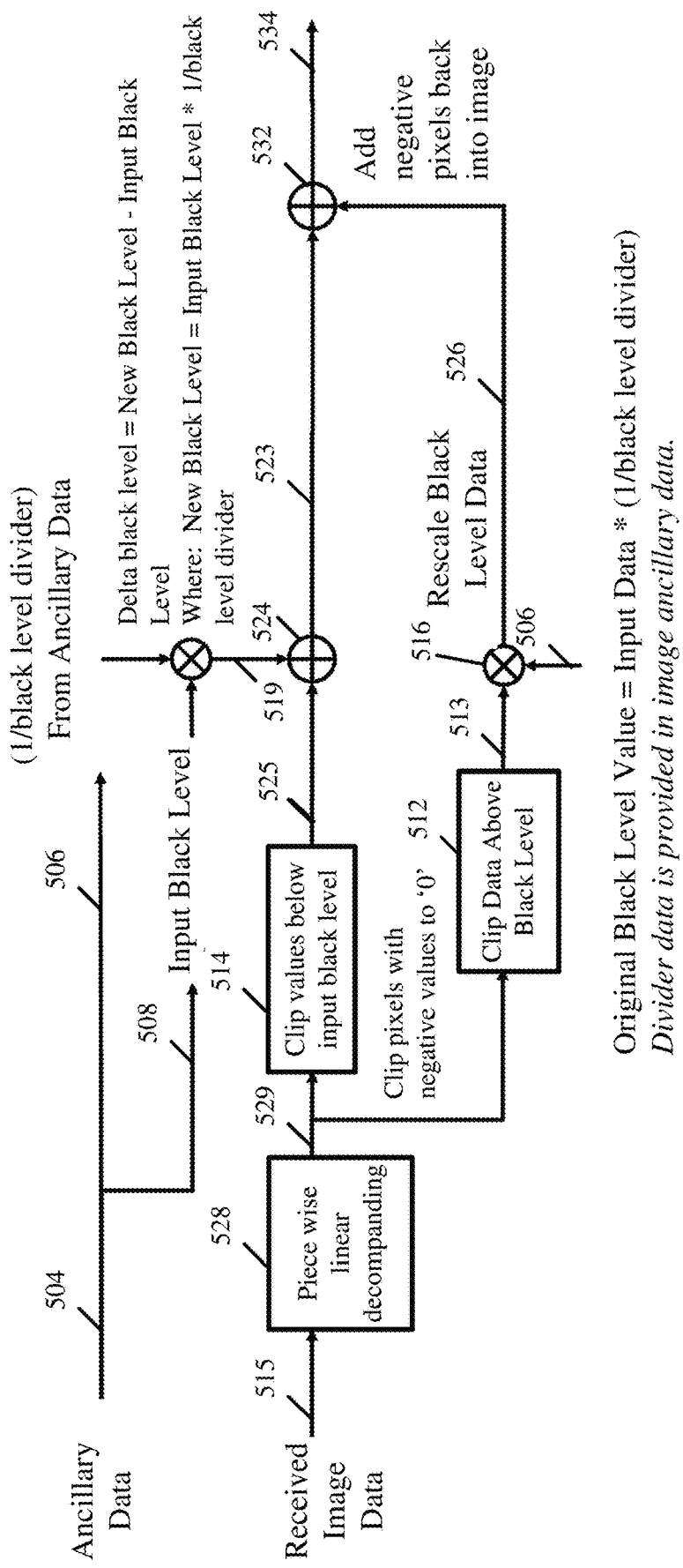
FIG. 5 is a schematic illustration of an image data receiver, in accordance with some demonstrative aspects.

Reference is made to FIG. 5, which schematically illustrates an image data receiver 520. For example, image data receiver 120 (FIG. 1) may include one or more elements of image data receiver 520 and/or may perform one or more operations and/or functionalities of image data receiver 520.

In some demonstrative aspects, as shown in FIG. 5, image data receiver 520 may receive image data 515, for example, from an image sensor, e.g., image sensor 100 (FIG. 1). For example, image data 515 may include image data 214 (FIG. 2).

In some demonstrative aspects, image data 515 may include compressed unsigned digital pixel data. For example, image data 515 may include compressed unsigned digital pixel data 327 (FIG. 3).

In some demonstrative aspects, as shown in FIG. 5, image data receiver 520 may receive ancillary data 504 corresponding to the image data 515. For example, ancillary data 504 may include ancillary data 212 (FIG. 2).

In some demonstrative aspects, ancillary data 504 may include information to indicate a black level scaling factor 506 and a first black level 508, e.g., which has been applied for generating the image data 515. For example, black level scaling factor 506 and/or first black level 508 may include the black level scaling factor and the black level applied by image sensor 300 (FIG. 3) for generating the compressed unsigned digital pixel data 327 (FIG. 3).

In some demonstrative aspects, as shown in FIG. 5, image data receiver 520 may be configured to read the "black level divider" and "input black level" parameters in the ancillary data 504. For example, image data receiver 520 may read the "black level divider" from the black level scaling factor 506, and the "input black level" from first black level 508.

In some demonstrative aspects, as shown in FIG. 5, image data receiver 520 may be configured to decompress and/or linearize the image data 515, for example, by decompanding the image data 515, for example, in case the image data 515 includes companded data, e.g., as described below.

In some demonstrative aspects, as shown in FIG. 5, image data receiver 520 may include a decompressor 528 configured to decompress, e.g., decompand and/or linearize, the received image data 515.

In some demonstrative aspects, as shown in FIG. 5, decompressor 528 may include a piecewise linear decompander 528.

In other aspects, decompressor 528 may include any other additional or alternative type of data decompressor.

In some demonstrative aspects, decompressor 528 may generate unsigned digital pixel data 529 based on the image data 515, for example, by decompanding image data 515, for example, based on compression information 206 (FIG. 2). For example, decompressor 528 may generate unsigned digital pixel data 529 by decompanding the image data 515 according to the piecewise liner companding configuration.

In some demonstrative aspects, as shown in FIG. 5, image data receiver 520 may include a first clipper 512 configured to clip input values, which are below the first black level, e.g., the input black level 508, from unsigned digital pixel data 529, for example, to generate a first plurality of input values 513.

In some demonstrative aspects, as shown in FIG. 5, image data receiver 520 may include a rescaler 516 configured to rescale the first plurality of input values 513, for example, based on an inverse of the black level scaling factor 506. For example, rescaler 516 may rescale the first plurality of clipped input values 513 based on an inverse of the black level scaling factor 506, which may represent the black level scaling factor applied by scaler 318 (FIG. 3).

In some demonstrative aspects, as shown in FIG. 5, rescaler 516 may generate rescaled input values 526 based on the first plurality of input values 513 and the black level scaling factor 506.

In one example, rescaler 516 may include a multiplier, which may be configured to multiply the first plurality of clipped input values 513, for example, by the inverse of the black level scaling factor 506.

In another example, rescaler 518 may include a divider, which may be configured to divide the first plurality of clipped input values 513, for example, by the black level scaling factor 506.

In some demonstrative aspects, as shown in FIG. 5, image data receiver 520 may include a second clipper 514 configured to clip input values, which are above the first black level, e.g., the input black level 508, from unsigned digital pixel data 529, for example, to generate a second plurality of input values 525.

In some demonstrative aspects, as shown in FIG. 5, image data receiver 520 may include a shifter 524 configured to shift the second plurality of input values 525, for example, based on a digital offset 519.

In some demonstrative aspects, as shown in FIG. 5, shifter 524 may generate shifted input values 523 based on the second plurality of clipped input values 525 and the digital offset 519.

In some demonstrative aspects, shifted input values 523 may be above a second black level, denoted New Black level.

In some demonstrative aspects, as shown in FIG. 5, the second black level may be based on a product of the first black level 508 multiplied by the inverse of the black level scaling factor 506.

In some demonstrative aspects, as shown in FIG. 5, the digital offset 519 may be determined, for example, based on a difference between the second black level and the first black level 508.

In some demonstrative aspects, as shown in FIG. 5, image data receiver 520 may include a combiner 532, e.g., an adder, configured to combine, e.g., add, the shifted input values 523 and the rescaled input values 526, for example, to generate unsigned digital pixel data 534.

In some demonstrative aspects, the unsigned digital pixel data 534 may include a first plurality of processed values below the second black level, e.g., based on the rescaled input values 526, and a second plurality of processed values above the second black level, e.g., based on the shifted input values 523.

Figure 6:
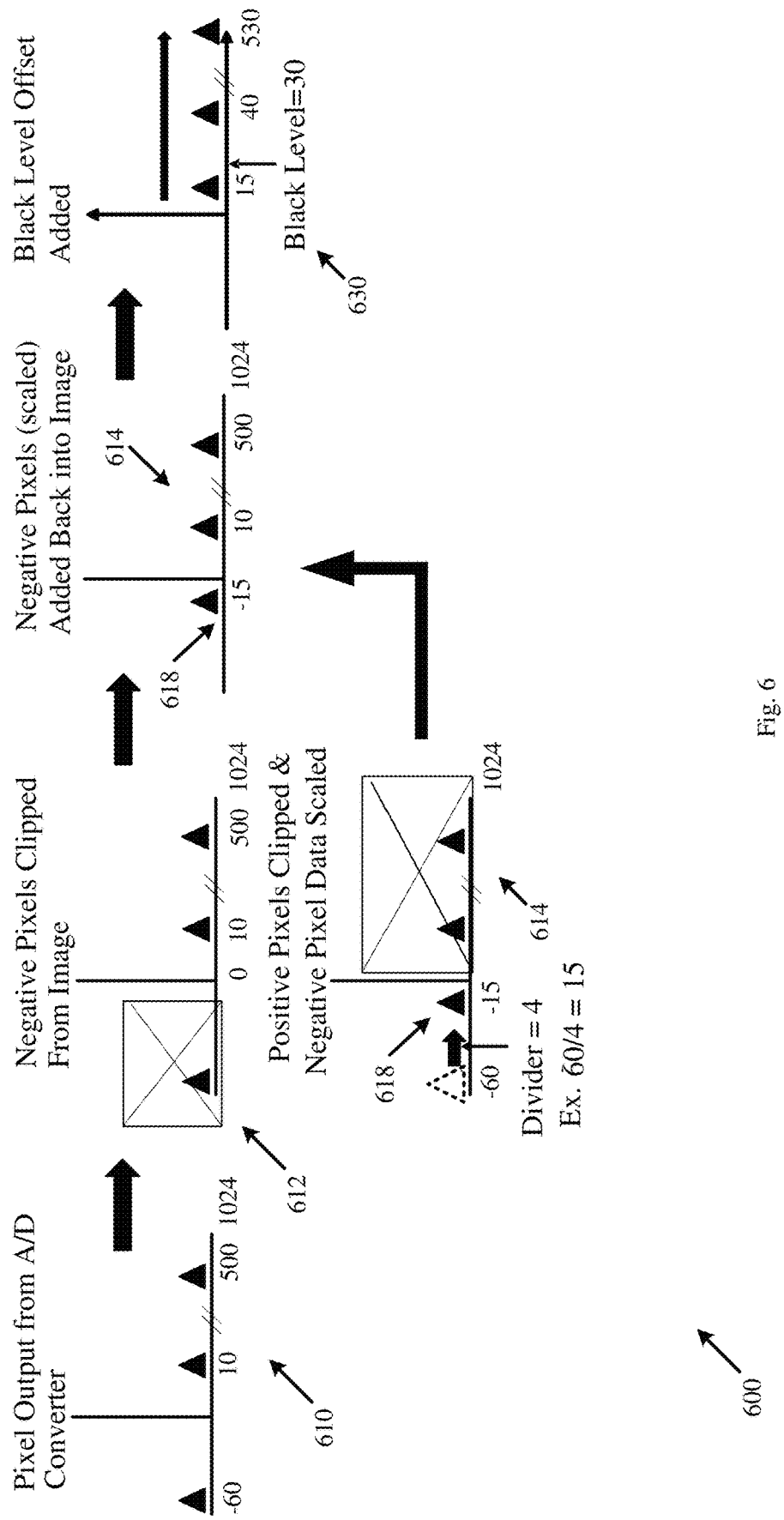
FIG. 6 is a schematic illustration of an example of a pixel data processing procedure to process signed pixel data, in accordance with some demonstrative aspects.

Reference is made to FIG. 6, which schematically illustrates an example of a pixel data processing procedure 600 to process signed pixel data 610, in accordance with some demonstrative aspects.

In some demonstrative aspects, an image sensor, e.g., image sensor 300 (FIG. 3), may be configured to perform one or more operations of pixel data processing procedure 600.

In some demonstrative aspects, as shown in FIG. 6, pixel data processing procedure 600 may be implemented to process signed pixel data 610, e.g., from an output of an A2D converter. For example, pixel data processing procedure 600 may be applied to process signed digital pixel data 307 (FIG. 3).

In some demonstrative aspects, as shown in FIG. 6, pixel data 610 may include pixel-read values over a signed range. For example, as shown in FIG. 6, pixel data 610 may include the pixel-read values (−60), 10, and 500.

In some demonstrative aspects, as shown in FIG. 6, pixel data processing procedure 600 may be implemented to perform a first processing route to clip negative pixel values 612 from pixel data 610. For example, pixel data processing procedure 600 may be implemented to clip the pixel-read value (−60) from pixel data 610. For example, clipper 312 (FIG. 3) may be configured to clip the pixel-read value (−60) from pixel data 610, e.g., as described above.

In some demonstrative aspects, as shown in FIG. 6, pixel data processing procedure 600 may be implemented to perform a second processing route to clip positive pixel values 614 from pixel data 610. For example, pixel data processing procedure 600 may be implemented to clip the pixel-read values 10 and 500 from pixel data 610. For example, clipper 314 (FIG. 3) may be configured to clip the pixel-read value 10 and 500 from pixel data 610, e.g., as described above.

In some demonstrative aspects, as shown in FIG. 6, pixel data processing procedure 600 may be implemented to scale the remaining negative pixel read values 612 in the second processing route, for example, based on a black level scaling factor, e.g., a black level scaling factor equal to 0.25. For example, pixel data processing procedure 600 may be implemented to scale the negative pixel value (−60) to the value (−15), for example, by dividing the pixel-read value (−60) by an inverse of the black level scaling factor of 0.25 (the divider). For example, scaler 316 (FIG. 3) may divide the pixel-read value (−60) by the inverse of the black level scaling factor of 0.25 (4), e.g., as described above.

In some demonstrative aspects, as shown in FIG. 6, pixel data processing procedure 600 may be implemented to combine the scaled negative pixel values 618 of the second processing route, e.g., the value (−15), with the remaining positive pixel values 614 of the first processing route. For example, adder 322 (FIG. 3) may combine the scaled negative pixel values 618, e.g., the value (−15), with the positive pixel values 614, e.g., the pixel values 10 and 500.

In some demonstrative aspects, as shown in FIG. 6, pixel data processing procedure 600 may be implemented to add a digital offset, e.g., a black level offset, to the combined pixel values, for example, to generate unsigned pixel data 630. For example, as shown in FIG. 6, a black level offset of "30" may be added to the positive pixel values 614 and to the scaled negative pixel values 618. For example, the unsigned pixel data 630 may include the unsigned values 15, 40 and 530, which may be generated by adding the value 30 to the signed values (−15), (10) and 500, respectively. For example, adder 324 (FIG. 3) may add the black level offset of 30 to the positive pixel values 614 and to the scaled negative pixel values 618, for example, to generate the unsigned pixel data 630 including the unsigned values 15, 40 and 530.

Figure 7:
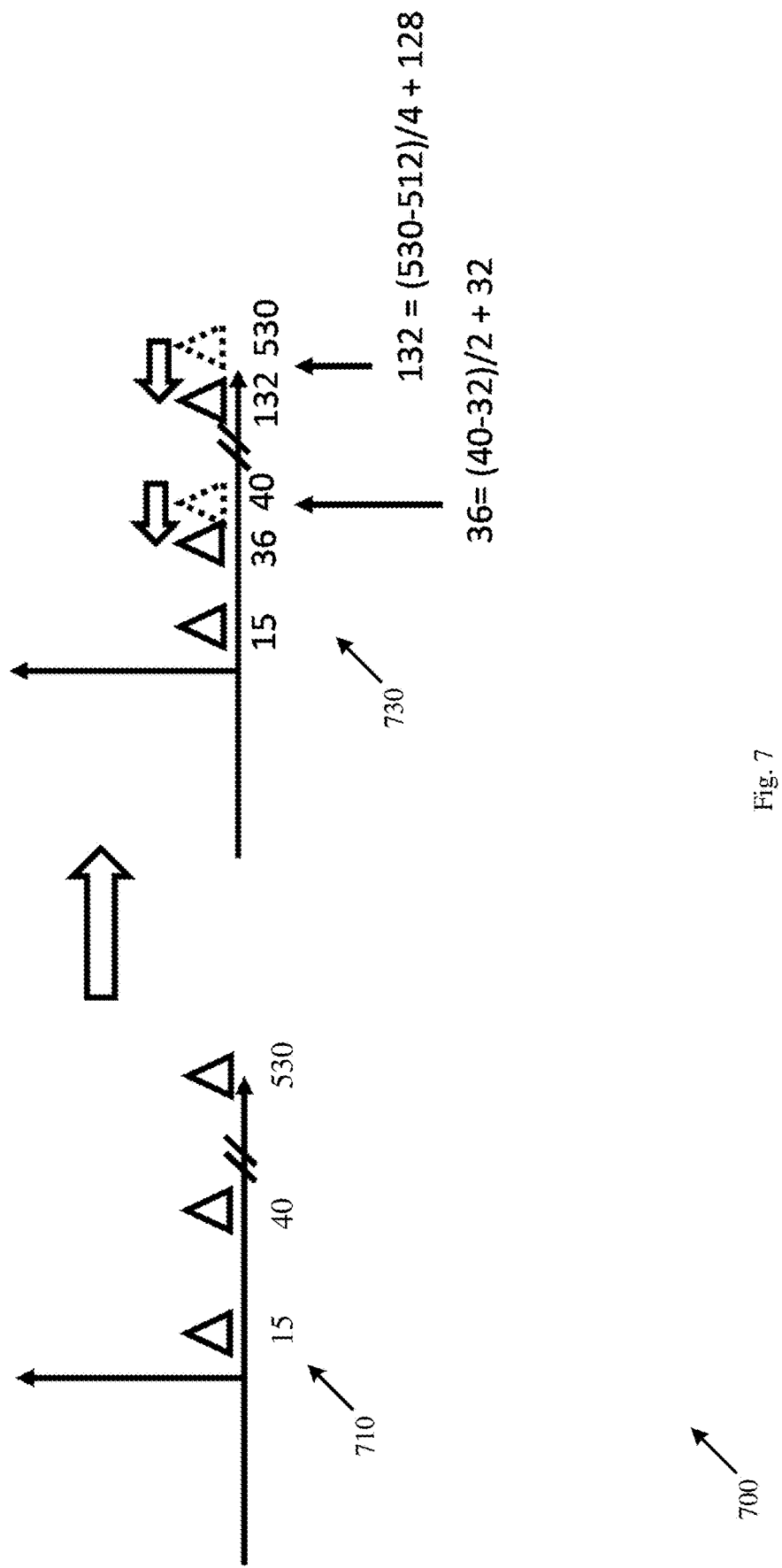
FIG. 7 is a schematic illustration of an example of a piecewise linear companding procedure to compand unsigned pixel data, in accordance with some demonstrative aspects.

Reference is made to FIG. 7, which schematically illustrates an example of a piecewise linear companding procedure 700 to compand unsigned pixel data 710, in accordance with some demonstrative aspects.

In some demonstrative aspects, a piecewise linear compander, e.g., piecewise linear compander 326 (FIG. 3), may be configured to perform one or more operations of piecewise linear companding procedure 700.

In some demonstrative aspects, as shown in FIG. 7, piecewise linear companding procedure 700 may be applied to unsigned pixel data 710, e.g., including unsigned pixel data 630 (FIG. 6). For example, unsigned pixel data 710 may include the unsigned pixel values 15, 40 and 530 of unsigned pixel data 630 (FIG. 6).

In some demonstrative aspects, piecewise linear companding procedure 700 may be implemented to reduce a data size of unsigned pixel data 710.

In some demonstrative aspects, piecewise linear companding procedure 700 may be implemented to generate compressed pixel data 730 based on unsigned pixel data 710.

In some demonstrative aspects, piecewise linear companding procedure 700 may be implemented to reduce the data size of unsigned pixel data 710, for example, according to a varying level of reductions.

In some demonstrative aspects, the varying level of reductions may be defined for example, by one or more knee points.

In some demonstrative aspects, piecewise linear companding procedure 700 may be implemented to reduce the data size of unsigned pixel data 710, for example, according to one or more knee points, which may be defined in a piecewise linear compander table, e.g., as follows:

TABLE 1

| Knee-Point | Input Value (10b) | Output Value (12b) | Slope (10b/8b) |
|---|---|---|---|
| 1 | 32 | 32 | 32/32 = 1 (no change from 0-32lsb (10b)) |
| 2 | 64 | 48 | (64-32)/(48-32) = 2 |
| ... | ... | ... | ... |
| 4 | 128 | 512 | |
| 5 | 256 | 1024 | (1024-512)/(256-128) = 4 |

In other aspects, the data size of unsigned pixel data 710 may be reduced, for example, according to any other additional or alternative table, algorithm, and/or scheme.

In some demonstrative aspects, as shown in FIG. 7, the unsigned pixel value 15 may be below the knee point 1. Accordingly, the unsigned pixel value 15 may not be reduced, e.g., the unsigned pixel value 15 may be compressed by a factor of 1.

In some demonstrative aspects, as shown in FIG. 7, the unsigned pixel value 40 may be above the knee point 1 and below the knee point 2. Accordingly, the unsigned pixel value 40 may be reduced, e.g., by a factor of 2, to a value of 36, e.g., (40−32)/2+32=36.

In some demonstrative aspects, as shown in FIG. 7, the unsigned pixel value 500 may be above the knee point 5. Accordingly, the unsigned pixel value 530 may be reduced, e.g., by a factor of 4, to a value of 132, e.g., (530−512)/4+128=132.

In one example, piecewise linear compander 326 (FIG. 3) may generate compressed pixel data 730 by reducing the data size of unsigned pixel data 710, for example, based on Table 1, e.g., as described above.

Figure 8:
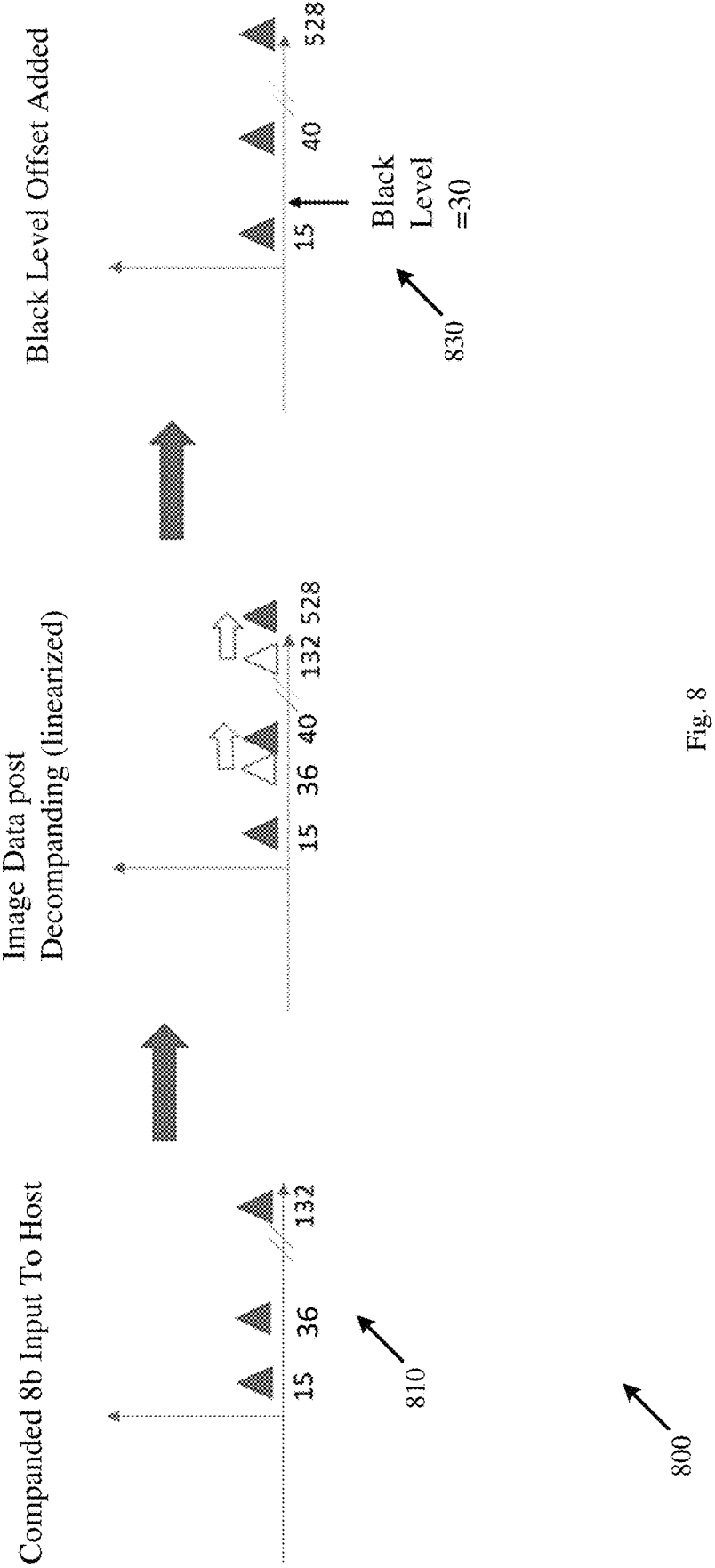
FIG. 8 is a schematic illustration of an example of a piecewise linear decompanding procedure to decompand unsigned pixel data, in accordance with some demonstrative aspects.

Reference is made to FIG. 8, which schematically illustrates a piecewise linear decompanding procedure 800 to decompound unsigned pixel data 810, in accordance with some demonstrative aspects.

In some demonstrative aspects, a piecewise linear decompander, e.g., piecewise linear decompander 528 (FIG. 5) may be configured to implement one or more operations of piecewise linear decompanding procedure 800.

In some demonstrative aspects, as shown in FIG. 8, piecewise linear companding procedure 800 may be applied to unsigned pixel data 810 including compressed unsigned pixel data. For example, piecewise linear companding procedure 800 may be applied to compressed unsigned pixel data 730 (FIG. 7). For example, compressed unsigned pixel data 810 may include the unsigned compressed values 15, 36 and 132 of unsigned pixel data 730 (FIG. 7).

In some demonstrative aspects, piecewise linear decompanding procedure 800 may be configured to decompress the unsigned pixel data 810, for example, to generate decompressed unsinged pixel data 830.

In some demonstrative aspects, piecewise linear decompanding procedure 800 may be implemented to decompress the data size of unsigned pixel data 810, for example, according to a varying level of decompressions, e.g., according to one or more knee points.

In some demonstrative aspects, piecewise linear decompanding procedure 800 may be implemented to decompress the data size of unsigned pixel data 810, for example, according to the one or more knee points of the piecewise linear compander Table 1, e.g., as described above.

In some demonstrative aspects, as shown in FIG. 8, the unsigned compressed pixel value 15 may be below the knee point 1. Accordingly, the unsigned compressed pixel value 15 may not be decompressed, e.g., the unsigned compressed pixel value 15 may be decompressed by a factor of 1.

In some demonstrative aspects, as shown in FIG. 8, the unsigned compressed pixel value 36 may be above the knee point 1 and below the knee point 2. Accordingly, the unsigned compressed pixel value 34 may be decompressed, e.g., by a factor of 2, to the value of 40, e.g., (36−32)*2+32.

In some demonstrative aspects, as shown in FIG. 8, the unsigned compressed pixel value 132 may be above the knee point 5. Accordingly, the unsigned pixel value 530 may be decompressed, e.g., by a factor of 4, to a value of 528, e.g., (132−128)*4+512=528.

In one example, piecewise linear decompander 528 (FIG. 5) may generate decompressed pixel data 830 based on the decompressed pixel values 810, e.g., as described above.

Figure 9:
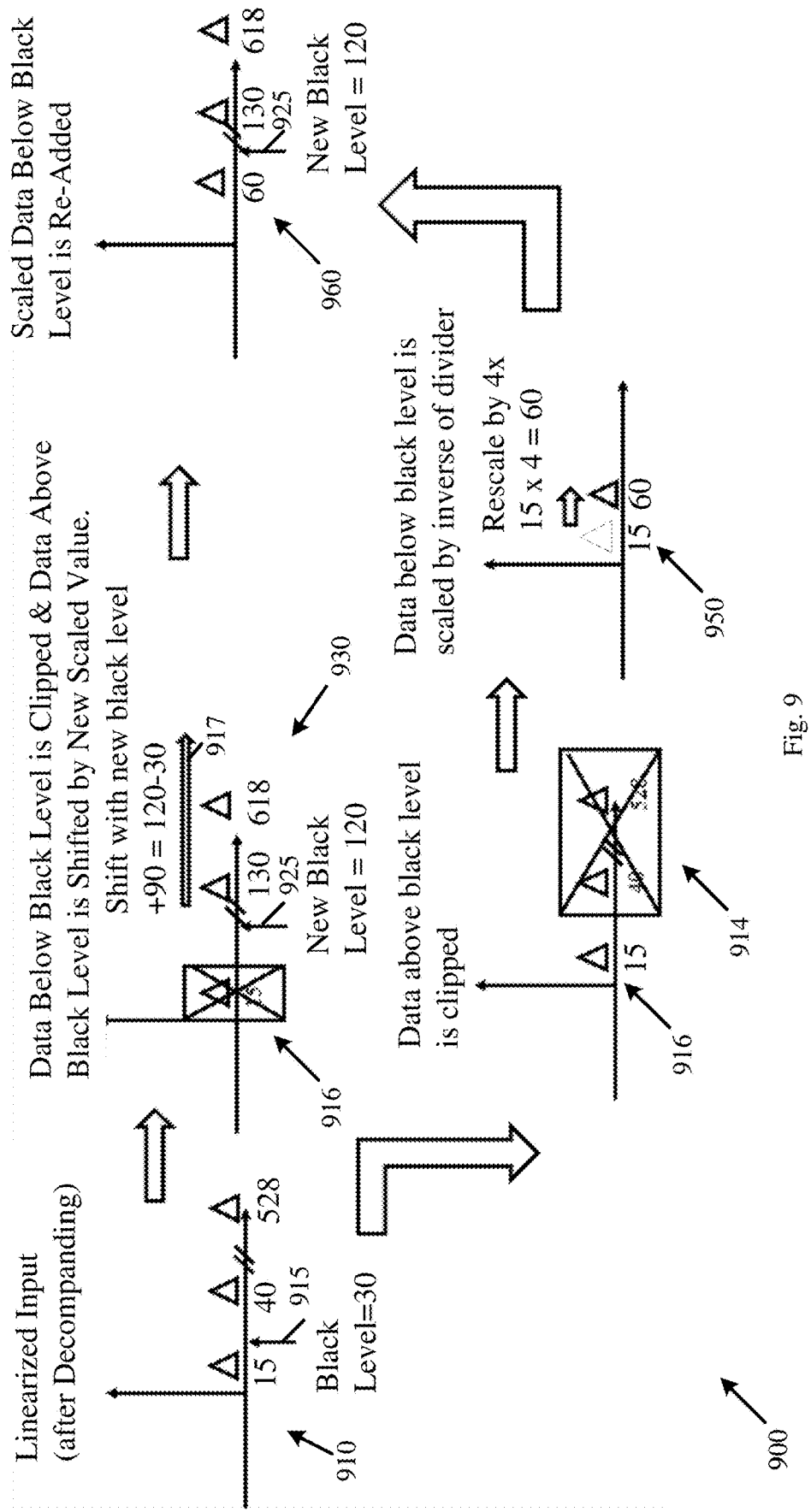
FIG. 9 is a schematic illustration of an example of a pixel data processing procedure to process unsigned pixel data, in accordance with some demonstrative aspects.

Reference is made to FIG. 9, which schematically illustrates an example of a pixel data processing procedure 900 to process unsigned pixel data 910, in accordance with some demonstrative aspects.

In some demonstrative aspects, an image data receiver, e.g., image data receiver 520 (FIG. 5), may be configured to implement one or more operations of pixel data processing procedure 900.

In some demonstrative aspects, unsigned pixel data 910 may include decompressed pixel data, for example, decompressed by a decompressor, e.g., decompressor 528 (FIG. 5).

In one example, pixel data processing procedure 900 may be implemented to process decompressed pixel data 830 (FIG. 8).

In some demonstrative aspects, as shown in FIG. 9, pixel data 910 may include input values 15, 40, and 528, e.g., of decompressed pixel data 830 (FIG. 8).

In some demonstrative aspects, as shown in FIG. 9, pixel data 910 may include data, e.g., the input value 15, which may be below a black level 915, e.g., a black level 30.

In some demonstrative aspects, as shown in FIG. 9, pixel data 910 may include data, e.g., the input values 40 and 528, which may be above the black level 915.

In some demonstrative aspects, as shown in FIG. 9, pixel data processing procedure 900 may be implemented in a first path and second path, e.g., as described below.

In some demonstrative aspects, as shown in FIG. 9, in the first path, pixel values below the 'black level' 915 may be removed. For example, in the first path, input values 916, which are below the black level 915, may be clipped, and input values 914, which are above the black level 915, may remain. For example, the black level 915 may be read from ancillary data, e.g., as described above.

In some demonstrative aspects, as shown in FIG. 9, in the first path, the pixel values 914, may be shifted, for example, based on a digital offset 917. For example, the digital offset 917 may be added to the positive data, e.g., to the input values 914.

In some demonstrative aspects, as shown in FIG. 9, in the second path, pixel values above the 'black level' 915, may be removed. For example, in the second path, the input values 914 above the black level 915 may be clipped.

In some demonstrative aspects, as shown in FIG. 9, in the second path, the remaining pixel values, e.g., the pixel values below the 'black level' 915, may be rescaled, e.g., scaled up, for example, based on the inverse of the black level scaling factor, e.g., the inverse of the black level divider. For example, in the second path, the input values 916 below the black level 915 may be scaled up.

In some demonstrative aspects, as shown in FIG. 9, pixel data processing procedure 900 may be implemented to combine the values from the first path and the second path, for example, by combining the scaled pixel data 950 from the second path with the shifted data 930 from the first path.

In some demonstrative aspects, as shown in FIG. 9, a second black level 925 may be calculated based on the first black level 915 ('black level'), and the inverse of the black level scaling factor ('black level divider').

In some demonstrative aspects, as shown in FIG. 9, pixel data processing procedure 900 may be implemented to generate a first clipped flow by clipping from pixel data 910 input values 914, which are above the black level 915. For example, pixel data processing procedure 900 may be implemented to generate the first clipped flow by clipping the pixel-read values 40 and 528 from pixel data 910. For example, clipper 512 (FIG. 5) may be configured to clip the input values 40 and 528 from pixel data 910, e.g., as described above.

In some demonstrative aspects, as shown in FIG. 9, pixel data processing procedure 900 may be implemented to generate a second clipped flow by clipping from pixel data 910 input values 916, which are below the black level 915. For example, pixel data processing procedure 900 may be implemented to generate the second clipped flow by clipping the input values 916 from pixel data 910. For example, clipper 514 (FIG. 5) may be configured to clip the input value 15 from pixel data 910, e.g., as described above.

In some demonstrative aspects, as shown in FIG. 9, pixel data processing procedure 900 may be implemented to rescale the remaining input values 916 in the first clipped flow, for example, to generate rescaled values 950.

In some demonstrative aspects, as shown in FIG. 9, pixel data processing procedure 900 may be configured to rescale the remaining input values 916 in the first clipped flow, for example, based on an inverse of a black level scaling factor, e.g., a black level scaling factor of 0.25. For example, pixel data processing procedure 900 may be implemented to rescale the input value of 15 to 60, for example, by multiplying the input value 15 by the inverse of the black level scaling factor, e.g., 14*4=60. For example, rescaler 516 (FIG. 5) may multiply the input value 15 by the inverse of the black level scaling factor (4), e.g., as described above.

In some demonstrative aspects, as shown in FIG. 9, pixel data processing procedure 900 may be implemented to apply a digital offset 917, e.g., a digital offset of 90, to the remaining input values 914 in the second clipped flow, for example, to generate shifted input values 930. For example, pixel data processing procedure 900 may be implemented to add the digital offset of 90 to the input values 40 and 528, for example, to generate shifted input values 930 including shifted input values 130 and 618. In one example, shifter 524 (FIG. 5) may add the digital offset of 90 to the input values of 40 and 528, for example, to generate shifted values 130 and 618, respectively.

In some demonstrative aspects, as shown in FIG. 9, pixel data processing procedure 900 may be implemented to combine the shifted input values 930, e.g., the shifted values 130 and 638, and scaled values 950, e.g., the scaled value of 60, for example, to generate processed pixel data 960. For example, combiner 524 (FIG. 5) may combine the shifted input values 930 and the scaled values 950, for example, to generate the processed pixel data 960.

In some demonstrative aspects, as shown in FIG. 9, processed pixel data 960 may include a first plurality of processed values below a second black level 925, e.g., a black level of 120, and a second plurality of processed values above the second black level 925.

For example, as shown in FIG. 9, the first plurality of processed values below the second black level 925 may include the rescaled value of 60, and the second plurality of processed values above the second black level 925 may include the shifted values of 130 and 618.

In some demonstrative aspects, the second black level 925 of 120 may be based on the first black level 915 multiplied by the inverse of the black level scaling factor (0.25), e.g., 4*30=120.

In some demonstrative aspects, as shown in FIG. 9, the digital offset of 90 may be based on a difference between the second black level 925 and the first black level 915, e.g., 120−30=90.

Figure 10:
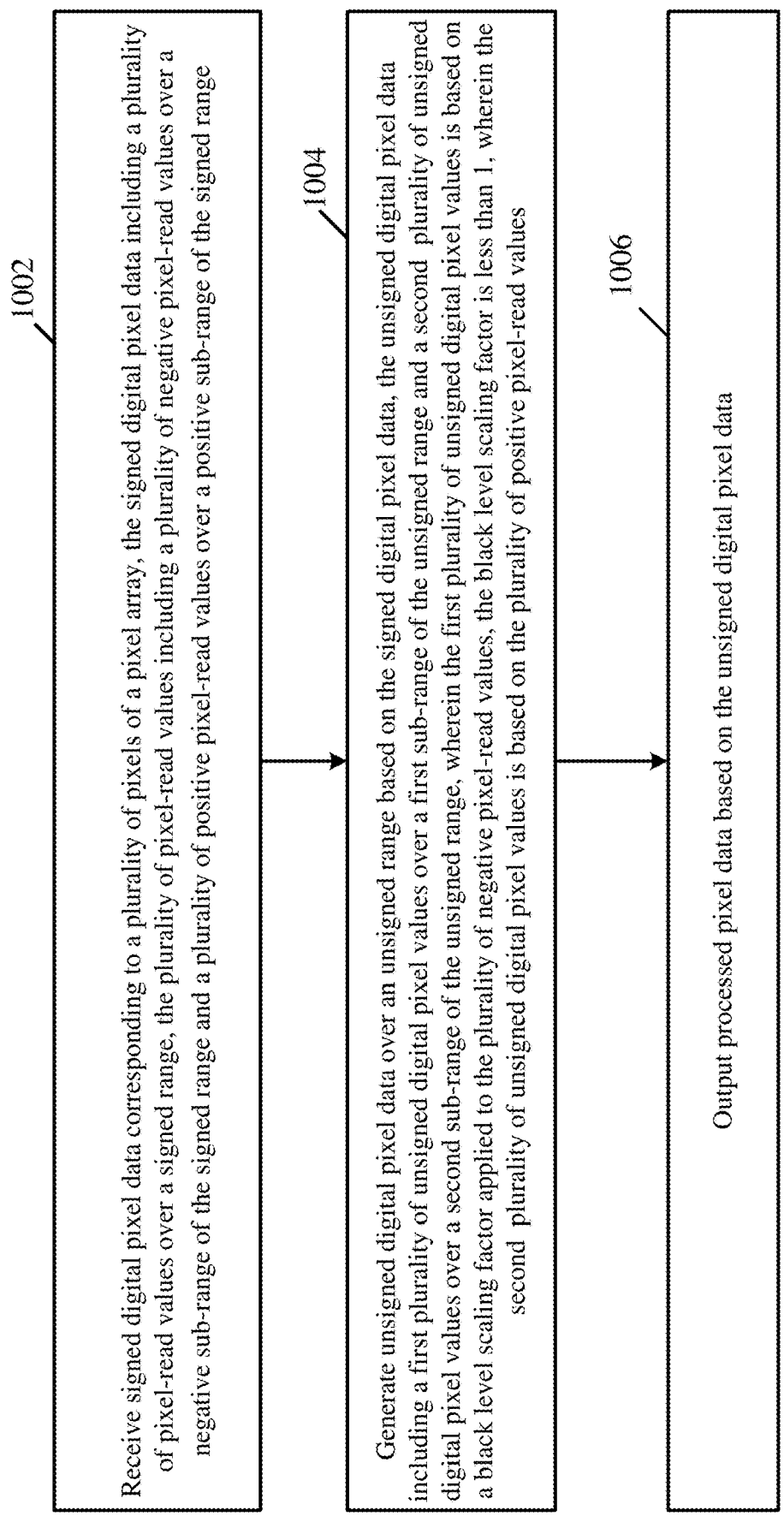
FIG. 10 is a schematic flow chart illustration of a method of processing pixel data, in accordance with some demonstrative aspects.

Reference is made to FIG. 10, which schematically illustrates a method of processing pixel data, in accordance with some demonstrative aspects. For example, one or more of the operations of the method of FIG. 10 may be performed by one or more elements of a system, e.g., system 101 (FIG. 1), for example, an image sensor, e.g., image sensor 100 (FIG. 1), a pixel processor, e.g., pixel processor 110 (FIG. 1), and/or a processor, e.g., processor 116 (FIG. 1).

As indicated at block 1002, the method may include receiving signed digital pixel data corresponding to a plurality of pixels of a pixel array. For example, the signed digital pixel data may include a plurality of pixel-read values over a signed range. For example, the plurality of pixel-read values may include a plurality of negative pixel-read values over a negative sub-range of the signed range, and a plurality of positive pixel-read values over a positive sub-range of the signed range. For example, processor 116 (FIG. 1) may receive, e.g., via input 112 (FIG. 1), the signed digital pixel data 113 (FIG. 1) corresponding to the plurality of pixels 105 (FIG. 1) of the pixel array 102 (FIG. 1), e.g., as described above.

As indicated at block 1004, the method may include generating unsigned digital pixel data over an unsigned range based on the signed digital pixel data. For example, the unsigned digital pixel data may include a first plurality of unsigned digital pixel values over a first sub-range of the unsigned range, and a second plurality of unsigned digital pixel values over a second sub-range of the unsigned range. For example, the first plurality of unsigned digital pixel values may be based on a black level scaling factor applied to the plurality of negative pixel-read values. For example, the black level scaling factor may be less than 1. For example, the second plurality of unsigned digital pixel values may be based on the plurality of positive pixel-read values. For example, processor 116 (FIG. 1) may generate unsigned digital pixel data 115 (FIG. 1) over the unsigned range, for example, based on the signed digital pixel data 113 (FIG. 1), e.g., as described above.

As indicated at block 1006, the method may include outputting processed pixel data based on the unsigned digital pixel data. For example, processor 116 (FIG. 1) may output, e.g., via output 114 (FIG. 1), the processed pixel data 117 (FIG. 1), for example, based on the unsigned digital pixel data 115 (FIG. 1), e.g., as described above.

Figure 11:
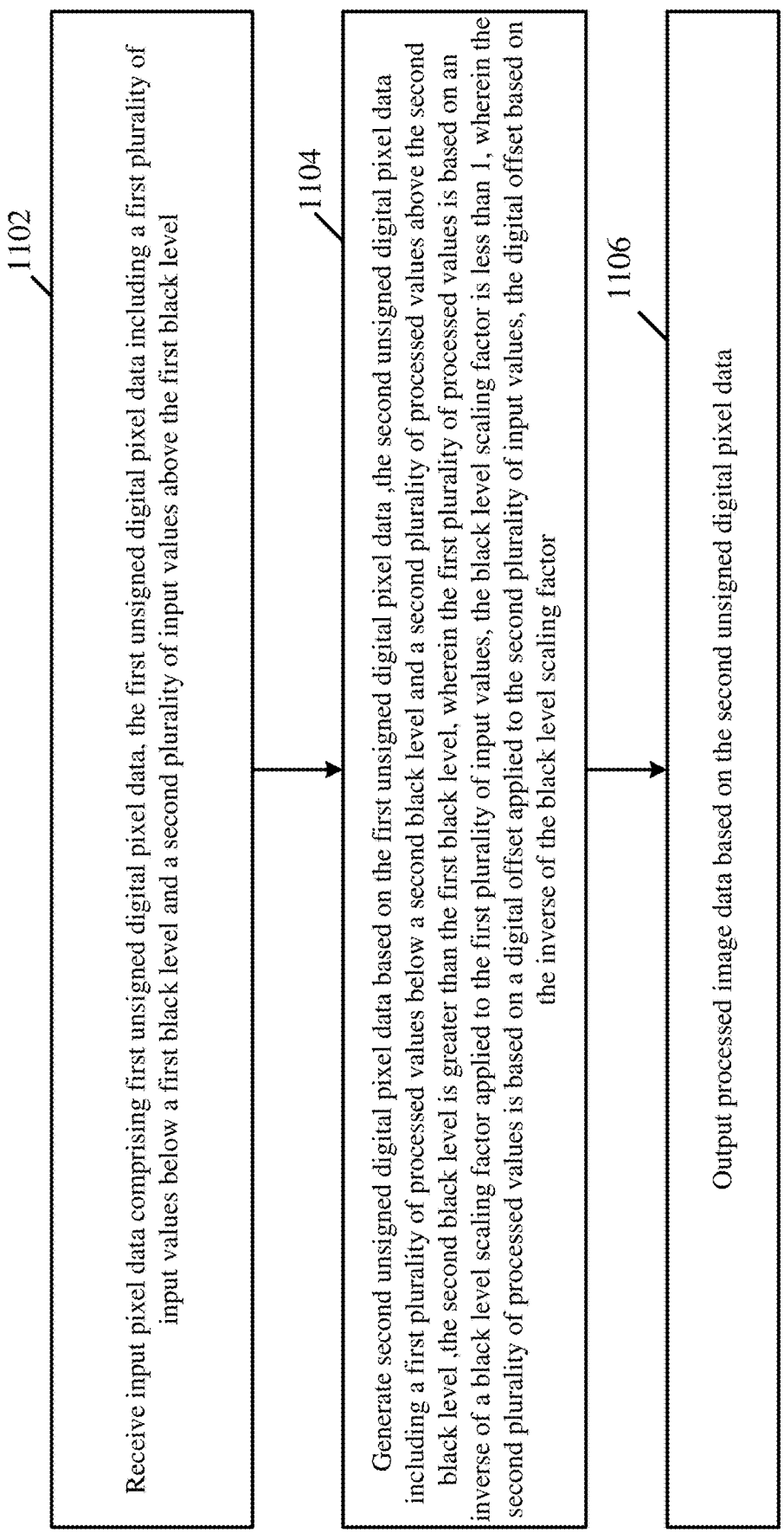
FIG. 11 is a schematic flow chart illustration of a method of processing pixel data, in accordance with some demonstrative aspects.

Reference is made to FIG. 11, which schematically illustrates a method of processing pixel data, in accordance with some demonstrative aspects. For example, one or more of the operations of the method of FIG. 11 may be performed by one or more elements of a system, e.g., system 101 (FIG. 1), for example, an image data receiver, e.g., image data receiver 120 (FIG. 1), an image processor, e.g., image processor 126 (FIG. 1), and/or a processor, e.g., processor 126 (FIG. 1).

As indicated at block 1102, the method may include receiving input pixel data including first unsigned digital pixel data. For example, the first unsigned digital pixel data may include a first plurality of input values below a first black level, and a second plurality of input values above the first black level. For example, processor 126 (FIG. 1) may receive, e.g., via input 122 (FIG. 1), the first unsigned digital pixel data including the first plurality of input values below the first black level, and the second plurality of input values above the first black level, e.g., as described above.

As indicated at block 1104, the method may include generating second unsigned digital pixel data based on the first unsigned digital pixel data. For example, the second unsigned digital pixel data may include a first plurality of processed values below a second black level, and a second plurality of processed values above the second black level. For example, the second black level may be greater than the first black level. For example, the first plurality of processed values may be based on an inverse of a black level scaling factor applied to the first plurality of input values. For example, the black level scaling factor may be less than 1. For example, the second plurality of processed values may be based on a digital offset applied to the second plurality of input values. For example, the digital offset may be based on the inverse of the black level scaling factor. For example, processor 126 (FIG. 1) may generate the second unsigned digital pixel data including the first plurality of processed values below the second black level, and the second plurality of processed values above the second black level, e.g., as described above.

As indicated at block 1106, the method may include outputting processed image data based on the second unsigned digital pixel data. For example, processor 126 (FIG. 1) may output, e.g., via output 124 (FIG. 1), the processed image data 125 (FIG. 1), for example, based on the second unsigned digital pixel data 127 (FIG. 1), e.g., as described above.

Figure 12:
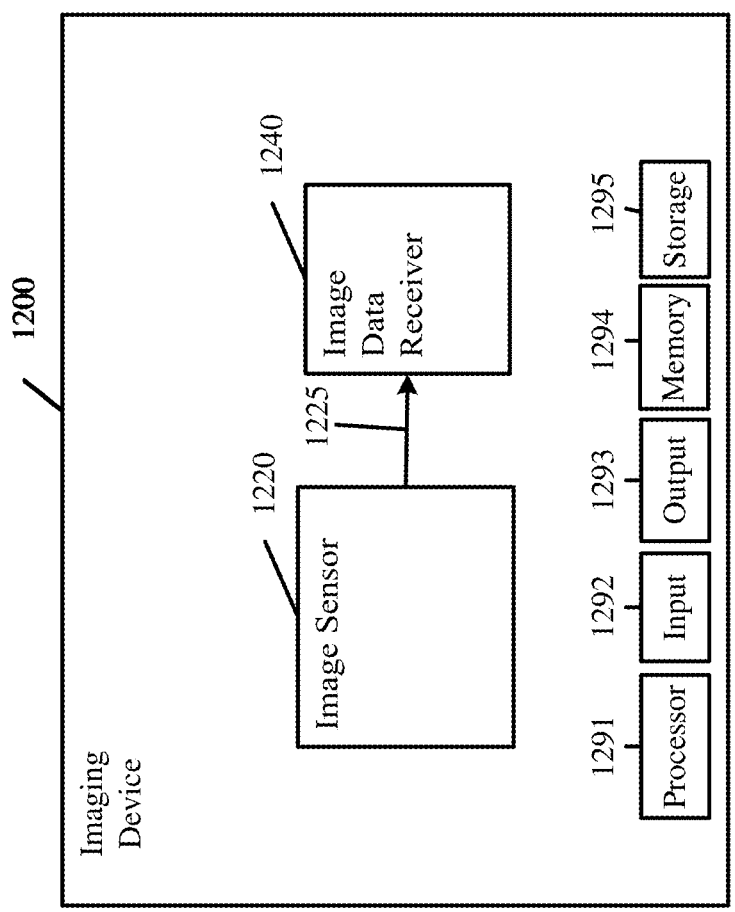
FIG. 12 is a schematic illustration of an imaging device, in accordance with some demonstrative aspects.

Reference is made to FIG. 12, which schematically illustrates an imaging device 1200, in accordance with some demonstrative aspects.

In one example, imagine device 1200 may be configured to capture, record, process, handle and/or store one or more photos, videos, movies, clips and/or the like.

In some demonstrative aspects, imagine device 1200 may include a camera, e.g., a digital camera, a digital video camera, a digital photo camera, a webcam, a mobile device, an imaging device, a medical imaging device, a mobile phone, e.g., including a camera, a Smartphone, and/or the like.

In some demonstrative aspects, imagine device 1200 may be implemented, for example, as part of a vehicle, e.g., to support an autonomous vehicle controller.

In some demonstrative aspects, imaging device 1200 may include an image sensor device 1220, e.g., a CIS. For example, sensor device 1220 may include one or more elements of image sensor 100 (FIG. 1).

In some demonstrative aspects, image sensor 1220 may be configured to capture one or more images, for example, by converting incoming photons into electronic signals.

In some demonstrative aspects, imaging device 1200 may include an image data receiver 1240, e.g., a CIS. For example, sensor device 1220 may include one or more elements of image data receiver 120 (FIG. 1).

In some demonstrative aspects, image data receiver 1240 may be configured to record, process, handle and/or store one or more images, photos, videos, movies, clips and/or the like.

In some demonstrative aspects, image sensor device 1220 may be configured to generate image data 1215, for example, to be processed by image data receiver 1240, e.g., as described above.

In some demonstrative aspects, imaging device 1200 may also include, for example, a processor 1291, an input unit 1292, an output unit 1293, a memory unit 1294, and/or a storage unit 1295. Imaging device 1200 may optionally include other suitable hardware components and/or software components. In some demonstrative aspects, some or all of the components of imaging device 1200 may be enclosed in a common housing or packaging, and may be interconnected or operably associated using one or more wired or wireless links. In other aspects, components of image sensing device 1200 may be distributed among multiple or separate devices.

In some demonstrative aspects, processor 1291 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 1291 executes instructions, for example, of an Operating System (OS) of imaging device 1200 and/or of one or more suitable applications.

In some demonstrative aspects, memory unit 1294 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 1295 may include, for example, a hard disk drive, a disk drive, a solid-state drive (SSD), and/or other suitable removable or non-removable storage units. For example, memory unit 1294 and/or storage unit 1295, for example, may store data processed by imaging device 1200.

In some demonstrative aspects, input unit 1292 may include, for example, a keyboard, a keypad, a mouse, a touch-screen, a touch-pad, a track-ball, a stylus, a microphone, or other suitable pointing device or input device. Output unit 1293 includes, for example, a monitor, a screen, a touch-screen, a flat panel display, a Light Emitting Diode (LED) display unit, an Organic LED (OLED) display unit, a Liquid Crystal Display (LCD) display unit, a plasma display unit, one or more audio speakers or earphones, or other suitable output devices.

Figure 13:
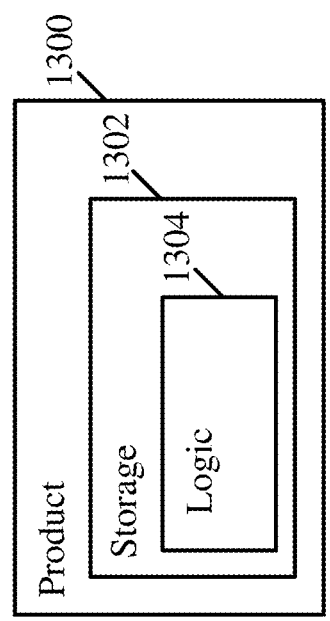
FIG. 13 is a schematic illustration of a product of manufacture, in accordance with some demonstrative aspects.

Reference is made to FIG. 13, which schematically illustrates a product of manufacture 1300, in accordance with some demonstrative aspects. Product 1300 may include one or more tangible computer-readable ("machine-readable") non-transitory storage media 1302, which may include computer-executable instructions, e.g., implemented by logic 1304, operable to, when executed by at least one computer processor, enable the at least one computer processor to implement one or more operations at image sensor 100 (FIG. 1), pixel processor 110 (FIG. 1), processor 116 (FIG. 1), image data receiver 120 (FIG. 1), image processor 130 (FIG. 1), and/or processor 126 (FIG. 1); to cause image sensor 100 (FIG. 1), pixel processor 110 (FIG. 1), processor 116 (FIG. 1), image data receiver 120 (FIG. 1), image processor 130 (FIG. 1), and/or processor 126 (FIG. 1), to perform, trigger and/or implement one or more operations and/or functionalities; and/or to perform, trigger and/or implement one or more operations and/or functionalities described with reference to the FIGS. 1-12, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1300 and/or machine-readable storage media 1302 may include one or more types of computer-readable storage media capable of storing data, including volatile memory, non-volatile memory, removable or non-removable memory, erasable or non-erasable memory, writeable or re-writeable memory, and the like. For example, machine-readable storage media 1302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1304 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes a pixel processor comprising an input to receive signed digital pixel data corresponding to a plurality of pixels of a pixel array, the signed digital pixel data comprising a plurality of pixel-read values over a signed range, the plurality of pixel-read values comprising a plurality of negative pixel-read values over a negative sub-range of the signed range and a plurality of positive pixel-read values over a positive sub-range of the signed range; a processor configured to generate unsigned digital pixel data over an unsigned range based on the signed digital pixel data, the unsigned digital pixel data comprising a first plurality of unsigned digital pixel values over a first sub-range of the unsigned range and a second plurality of unsigned digital pixel values over a second sub-range of the unsigned range, wherein the first plurality of unsigned digital pixel values is based on a black level scaling factor applied to the plurality of negative pixel-read values, the black level scaling factor is less than 1, and optionally, wherein the second plurality of unsigned digital pixel values is based on the plurality of positive pixel-read values; and an output to output processed pixel data based on the unsigned digital pixel data.

Example 2 includes the subject matter of Example 1, and optionally, wherein the black level scaling factor is less than a light level scaling factor between a size of the positive sub-range of the signed range and a size of the second sub-range of the unsigned range.

Example 3 includes the subject matter of Example 2, and optionally, wherein the light level scaling factor is equal to 1.

Example 4 includes the subject matter of Example 2, and optionally, wherein the light level scaling factor is less than 1.

Example 5 includes the subject matter of any one of Examples 1-4, and optionally, wherein a size of the first sub-range of the unsigned range is based on the black level scaling factor applied to a size of the negative sub-range of the signed range.

Example 6 includes the subject matter of any one of Examples 1-5, and optionally, wherein a size of the first sub-range of the unsigned range is smaller than a size of the negative sub-range of the signed range.

Example 7 includes the subject matter of any one of Examples 1-6, and optionally, wherein a size of the first sub-range of the unsigned range is smaller than a size of the second sub-range of the unsigned range.

Example 8 includes the subject matter of any one of Examples 1-7, and optionally, wherein the plurality of negative pixel-read values is represented over a plurality of negative levels in the negative sub-range of the signed range, wherein the first plurality of unsigned digital pixel values is represented over a plurality of unsigned levels in the first sub-range of the unsigned range, wherein a count of the plurality of unsigned levels in the first sub-range of the unsigned range is less than a count of the plurality of negative levels in the negative sub-range of the signed range.

Example 9 includes the subject matter of any one of Examples 1-8, and optionally, wherein the plurality of pixel-read values is represented over a plurality of signed levels in the signed range, wherein the unsigned digital pixel data is represented over a plurality of unsigned levels in the unsigned range, wherein a count of the plurality of unsigned levels in the unsigned range is less than a count of the plurality of signed levels in the signed range.

Example 10 includes the subject matter of any one of Examples 1-9, and optionally, wherein the processor is configured to generate the second plurality of unsigned digital pixel values by applying a digital offset to the plurality of positive pixel-read values, and to generate the first plurality of unsigned digital pixel values based on the digital offset and the black level scaling factor.

Example 11 includes the subject matter of Example 10, and optionally, wherein the processor is configured to generate a plurality of scaled negative pixel-read values by applying the black level scaling factor to the plurality of negative pixel-read values, and to generate the first plurality of unsigned digital pixel values by applying the digital offset to the plurality of scaled negative pixel-read values.

Example 12 includes the subject matter of any one of Examples 1-11, and optionally, wherein the processor is configured to generate the first plurality of unsigned digital pixel values based on a product of the negative pixel-read values multiplied by the black level scaling factor.

Example 13 includes the subject matter of any one of Examples 1-12, and optionally, wherein the processed pixel data comprises black level scaling information configured to indicate the black level scaling factor.

Example 14 includes the subject matter of any one of Examples 1-13, and optionally, wherein the processed pixel data is based on a data compression of the unsigned digital pixel data.

Example 15 includes the subject matter of Example 14, and optionally, wherein the processed pixel data comprises data compression information to indicate a configuration of the data compression.

Example 16 includes the subject matter of Example 14 or 15, and optionally, wherein the data compression comprises a piecewise linear companding.

Example 17 includes the subject matter of any one of Examples 1-16, and optionally, wherein the processor is configured to determine the black level scaling factor based on one or more image sensor parameters of an image sensor comprising the pixel processor.

Example 18 includes the subject matter of Example 17, and optionally, wherein the one or more image sensor parameters comprises at least one of a temperature of the pixel array, an integration parameter of the image sensor, or a gain of an amplifier of the image sensor.

Example 19 includes the subject matter of Example 17 or 18, and optionally, wherein the processor is configured to adjust the black level scaling factor based on a change in the one or more image sensor parameters.

Example 20 includes the subject matter of any one of Examples 17-19, and optionally, wherein the processor is configured to determine a first black level scaling factor based on a first configuration of the one or more image sensor parameters, and to determine a second black level scaling factor based on a second configuration of the one or more image sensor parameters, wherein the second black level scaling factor is different from the first black level scaling factor, the second configuration of the one or more image sensor parameters is different from the first configuration of the one or more image sensor parameters.

Example 21 includes an image processor comprising an input to receive input pixel data comprising first unsigned digital pixel data, the first unsigned digital pixel data comprising a first plurality of input values below a first black level and a second plurality of input values above the first black level; a processor configured to generate second unsigned digital pixel data based on the first unsigned digital pixel data, the second unsigned digital pixel data comprising a first plurality of processed values below a second black level and a second plurality of processed values above the second black level, the second black level is greater than the first black level, wherein the first plurality of processed values is based on an inverse of a black level scaling factor applied to the first plurality of input values, the black level scaling factor is less than 1, and optionally, wherein the second plurality of processed values is based on a digital offset applied to the second plurality of input values, the digital offset based on the inverse of the black level scaling factor; and an output to output processed image data based on the second unsigned digital pixel data.

Example 22 includes the subject matter of Example 21, and optionally, wherein the digital offset is based on the first black level.

Example 23 includes the subject matter of Example 21 or 22, and optionally, wherein the digital offset is based on a product of the first black level multiplied by the inverse of the black level scaling factor.

Example 24 includes the subject matter of Example 23, and optionally, wherein the digital offset is based on a difference between a first value and a second value, the first value comprising the product of the first black level multiplied by the inverse of the black level scaling factor, the second value comprising the first black level.

Example 25 includes the subject matter of any one of Examples 21-24, and optionally, wherein the digital offset is based on the first black level and the second black level.

Example 26 includes the subject matter of any one of Examples 21-25, and optionally, wherein the digital offset is based on a difference between the second black level and the first black level.

Example 27 includes the subject matter of any one of Examples 21-26, and optionally, wherein the second black level is based on a product of the first black level multiplied by the inverse of the black level scaling factor.

Example 28 includes the subject matter of any one of Examples 21-27, and optionally, wherein the processor is configured to generate the first plurality of processed values based on a product of the first plurality of input values multiplied by the inverse of the black level scaling factor.

Example 29 includes the subject matter of any one of Examples 21-28, and optionally, wherein the input pixel data comprises black level scaling information configured to indicate the black level scaling factor.

Example 30 includes the subject matter of any one of Examples 21-29, and optionally, wherein the input pixel data comprises data compression information to indicate a configuration of a data compression, wherein the processor is configured to generate the second unsigned digital pixel data based on the data compression information.

Example 31 includes the subject matter of Example 30, and optionally, wherein the processor is configured to generate de-compressed digital pixel data based on a data decompression of the first unsigned digital pixel data according to the data compression information, and to generate the second unsigned digital pixel data based on the de-compressed digital pixel data.

Example 32 includes the subject matter of Example 30 or 31, and optionally, wherein the data compression comprises a piecewise linear companding.

Example 33 include an image sensor comprising a pixel array comprising a plurality of pixels configured to generate analog pixel data; an amplifier configured to generate amplified analog pixel data based on the analog pixel data; an Analog to Digital (A2D) converter configured to convert the amplified analog pixel data into signed digital pixel data comprising a plurality of pixel-read values over a signed range, the plurality of pixel-read values comprising a plurality of negative pixel-read values over a negative sub-range of the signed range and a plurality of positive pixel-read values over a positive sub-range of the signed range; and a pixel processor configured to generate unsigned digital pixel data over an unsigned range based on the signed digital pixel data, the unsigned digital pixel data comprising a first plurality of unsigned digital pixel values over a first sub-range of the unsigned range and a second plurality of unsigned digital pixel values over a second sub-range of the unsigned range, wherein the first plurality of unsigned digital pixel values is based on a black level scaling factor applied to the plurality of negative pixel-read values, the black level scaling factor is less than 1, and optionally, wherein the second plurality of unsigned digital pixel values is based on the plurality of positive pixel-read values.

Example 34 includes the subject matter of Example 33, and optionally, wherein the pixel processor comprises the pixel processor of any of Examples 1-20.

Example 35 includes a device comprising the pixel processor of any of Examples 1-20 and the image processor of any of Examples 21-32.

Example 36 includes a device comprising the image sensor of any of Examples 33-34 and the image processor of any of Examples 21-32.

Example 37 includes a method comprising receiving signed digital pixel data corresponding to a plurality of pixels of a pixel array, wherein the signed digital pixel data comprises a plurality of pixel-read values over a signed range, the plurality of pixel-read values comprising a plurality of negative pixel-read values over a negative sub-range of the signed range, and a plurality of positive pixel-read values over a positive sub-range of the signed range; generating unsigned digital pixel data over an unsigned range based on the signed digital pixel data, wherein the unsigned digital pixel data comprises a first plurality of unsigned digital pixel values over a first sub-range of the unsigned range, and a second plurality of unsigned digital pixel values over a second sub-range of the unsigned range, wherein the first plurality of unsigned digital pixel values is based on a black level scaling factor applied to the plurality of negative pixel-read values, the black level scaling factor is less than 1, and optionally, wherein the second plurality of unsigned digital pixel values is based on the plurality of positive pixel-read values; and outputting processed pixel data based on the unsigned digital pixel data.

Example 38 includes the method of Example 37, and optionally, comprising one or more operations according to any of Examples 1-36.

Example 39 includes a method comprising receiving input pixel data comprising first unsigned digital pixel data, the first unsigned digital pixel data comprising a first plurality of input values below a first black level, and a second plurality of input values above the first black level; generating second unsigned digital pixel data based on the first unsigned digital pixel data, wherein the second unsigned digital pixel data comprises a first plurality of processed values below a second black level, and a second plurality of processed values above the second black level, the second black level is greater than the first black level, wherein the first plurality of processed values is based on an inverse of a black level scaling factor applied to the first plurality of input values, the black level scaling factor is less than 1, and optionally, wherein the second plurality of processed values is based on a digital offset applied to the second plurality of input values, the digital offset is based on the inverse of the black level scaling factor; and outputting processed image data based on the second unsigned digital pixel data.

Example 40 includes the method of Example 39, and optionally, comprising one or more operations according to any of Examples 1-38.

Example 41 includes an apparatus comprising means for performing operations according to any of Examples 1-40.

Example 42 includes a product comprising one or more tangible computer-readable non-transitory storage media comprising instructions operable to, when executed by at least one processor, enable the at least one processor to cause operations according to any of Examples 1-40.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A pixel processor comprising:
an input to receive signed digital pixel data corresponding to a plurality of pixels of a pixel array, the signed digital pixel data comprising a plurality of pixel-read values over a signed range, the plurality of pixel-read values comprising a plurality of negative pixel-read values over a negative sub-range of the signed range and a plurality of positive pixel-read values over a positive sub-range of the signed range;
a processor configured to generate unsigned digital pixel data over an unsigned range based on the signed digital pixel data, the unsigned digital pixel data comprising a first plurality of unsigned digital pixel values over a first sub-range of the unsigned range and a second plurality of unsigned digital pixel values over a second sub-range of the unsigned range, wherein the first plurality of unsigned digital pixel values is based on a black level scaling factor applied to the plurality of negative pixel-read values, the black level scaling factor is less than 1, wherein the second plurality of unsigned digital pixel values is based on the plurality of positive pixel-read values; and
an output to output processed pixel data based on the unsigned digital pixel data.

2. The pixel processor of claim 1, wherein the black level scaling factor is less than a light level scaling factor between a size of the positive sub-range of the signed range and a size of the second sub-range of the unsigned range.

3. The pixel processor of claim 1, wherein a size of the first sub-range of the unsigned range is based on the black level scaling factor applied to a size of the negative sub-range of the signed range.

4. Th The pixel processor of claim 1, wherein a size of the first sub-range of the unsigned range is smaller than a size of the negative sub-range of the signed range.

5. The pixel processor of claim 1, wherein a size of the first sub-range of the unsigned range is smaller than a size of the second sub-range of the unsigned range.

6. The pixel processor of claim 1, wherein the plurality of negative pixel-read values is represented over a plurality of negative levels in the negative sub-range of the signed range, wherein the first plurality of unsigned digital pixel values is represented over a plurality of unsigned levels in the first sub-range of the unsigned range, wherein a count of the plurality of unsigned levels in the first sub-range of the unsigned range is less than a count of the plurality of negative levels in the negative sub-range of the signed range.

7. The pixel processor of claim 1, wherein the plurality of pixel-read values is represented over a plurality of signed levels in the signed range, wherein the unsigned digital pixel data is represented over a plurality of unsigned levels in the unsigned range, wherein a count of the plurality of unsigned levels in the unsigned range is less than a count of the plurality of signed levels in the signed range.

8. The pixel processor of claim 1, wherein the processor is configured to generate the second plurality of unsigned digital pixel values by applying a digital offset to the plurality of positive pixel-read values, and to generate the first plurality of unsigned digital pixel values based on the digital offset and the black level scaling factor.

9. The pixel processor of claim 8, wherein the processor is configured to generate a plurality of scaled negative pixel-read values by applying the black level scaling factor to the plurality of negative pixel-read values, and to generate the first plurality of unsigned digital pixel values by applying the digital offset to the plurality of scaled negative pixel-read values.

10. The pixel processor of claim 1, wherein the processor is configured to generate the first plurality of unsigned digital pixel values based on a product of the negative pixel-read values multiplied by the black level scaling factor.

11. The pixel processor of claim 1, wherein the processed pixel data comprises black level scaling information configured to indicate the black level scaling factor.

12. The pixel processor of claim 1, wherein the processed pixel data is based on a data compression of the unsigned digital pixel data.

13. The pixel processor of claim 12, wherein the processed pixel data comprises data compression information to indicate a configuration of the data compression.

14. The pixel processor of claim 12, wherein the data compression comprises a piecewise linear companding.

15. The pixel processor of claim 1, wherein the processor is configured to determine the black level scaling factor based on one or more image sensor parameters of an image sensor comprising the pixel processor.

16. The pixel processor of claim 15, wherein the one or more image sensor parameters comprises at least one of a temperature of the pixel array, an integration parameter of the image sensor, or a gain of an amplifier of the image sensor.

17. The pixel processor of claim 15, wherein the processor is configured to determine a first black level scaling factor based on a first configuration of the one or more image sensor parameters, and to determine a second black level scaling factor based on a second configuration of the one or more image sensor parameters, wherein the second black level scaling factor is different from the first black level scaling factor, the second configuration of the one or more image sensor parameters is different from the first configuration of the one or more image sensor parameters.

18. An image sensor comprising:
a pixel array comprising a plurality of pixels configured to generate analog pixel data;
an amplifier configured to generate amplified analog pixel data based on the analog pixel data;
an Analog to Digital (A2D) converter configured to convert the amplified analog pixel data into signed digital pixel data comprising a plurality of pixel-read values over a signed range, the plurality of pixel-read values comprising a plurality of negative pixel-read values over a negative sub-range of the signed range and a plurality of positive pixel-read values over a positive sub-range of the signed range; and
a pixel processor configured to generate unsigned digital pixel data over an unsigned range based on the signed digital pixel data, the unsigned digital pixel data comprising a first plurality of unsigned digital pixel values over a first sub-range of the unsigned range and a second plurality of unsigned digital pixel values over a second sub-range of the unsigned range, wherein the first plurality of unsigned digital pixel values is based on a black level scaling factor applied to the plurality of negative pixel-read values, the black level scaling factor is less than 1, wherein the second plurality of unsigned digital pixel values is based on the plurality of positive pixel-read values.

19. The image sensor of claim 18, wherein the black level scaling factor is less than a light level scaling factor between a size of the positive sub-range of the signed range and a size of the second sub-range of the unsigned range.

20. The image sensor of claim 18, wherein the pixel processor is configured to generate the second plurality of unsigned digital pixel values by applying a digital offset to the plurality of positive pixel-read values, and to generate the first plurality of unsigned digital pixel values based on the digital offset and the black level scaling factor.

21. A product comprising one or more tangible computer-readable non-transitory storage media comprising instructions operable to, when executed by at least one processor, enable the at least one processor to cause a pixel processor to:

process signed digital pixel data corresponding to a plurality of pixels of a pixel array to generate unsigned digital pixel data over an unsigned range based on the signed digital pixel data, wherein the signed digital pixel data comprises a plurality of pixel-read values over a signed range, the plurality of pixel-read values comprising a plurality of negative pixel-read values over a negative sub-range of the signed range, and a plurality of positive pixel-read values over a positive sub-range of the signed range, wherein the unsigned digital pixel data comprises a first plurality of unsigned digital pixel values over a first sub-range of the unsigned range, and a second plurality of unsigned digital pixel values over a second sub-range of the unsigned range, wherein the first plurality of unsigned digital pixel values is based on a black level scaling factor applied to the plurality of negative pixel-read values, the black level scaling factor is less than 1, wherein the second plurality of unsigned digital pixel values is based on the plurality of positive pixel-read values; and output processed pixel data based on the unsigned digital pixel data.

22. The product of claim 21, wherein the black level scaling factor is less than a light level scaling factor between a size of the positive sub-range of the signed range and a size of the second sub-range of the unsigned range.

23. The product of claim 21, wherein the instructions, when executed, cause the pixel processor to generate the second plurality of unsigned digital pixel values by applying a digital offset to the plurality of positive pixel-read values, and to generate the first plurality of unsigned digital pixel values based on the digital offset and the black level scaling factor.

\* \* \* \* \*